United States Patent
Frohnhoefer et al.

(10) Patent No.: US 7,801,834 B2
(45) Date of Patent: Sep. 21, 2010

(54) METHOD AND APPARATUS FOR ESTIMATOR TOOL

(75) Inventors: Raymond William Frohnhoefer, San Diego, CA (US); Richard Lalith Mendis, Fairfax, VA (US); Jean Ellen Tabaka, Boulder, CO (US)

(73) Assignee: Siebel Systems, Inc., San Mateo, CA (US)

( * ) Notice: Subject to any disclaimer, the term of this patent is extended or adjusted under 35 U.S.C. 154(b) by 2091 days.

(21) Appl. No.: 10/109,262

(22) Filed: Mar. 28, 2002

(65) Prior Publication Data

US 2007/0203856 A1     Aug. 30, 2007

(51) Int. Cl.
    *G06Q 99/00*     (2006.01)
(52) U.S. Cl. .......................... 705/400; 705/1.1; 705/32; 705/54; 705/56; 706/12; 717/101; 717/110
(58) Field of Classification Search ................. 705/400, 705/34, 52, 1.1, 9, 54, 56, 1, 32; 717/101; 709/205, 222; 706/12
See application file for complete search history.

(56) References Cited

U.S. PATENT DOCUMENTS

| | | | | |
|---|---|---|---|---|
| 5,535,388 | A * | 7/1996 | Takeda | 717/101 |
| 6,212,549 | B1 * | 4/2001 | Page et al. | 709/205 |
| 6,550,053 | B1 * | 4/2003 | Muckley | 717/100 |
| 6,810,392 | B1 * | 10/2004 | Piggott | 706/12 |
| 6,938,007 | B1 * | 8/2005 | Iulianello et al. | 705/34 |
| 7,257,802 | B2 * | 8/2007 | Daw et al. | 716/18 |
| 7,337,150 | B2 * | 2/2008 | Fellenstein et al. | 705/400 |
| 2003/0055788 | A1 * | 3/2003 | Sakuma et al. | 705/52 |
| 2003/0144969 | A1 * | 7/2003 | Coyne | 705/400 |

FOREIGN PATENT DOCUMENTS

JP      2000339147 A   *   12/2000

OTHER PUBLICATIONS

Chulani, Sunita, "Software Development Cost Estimation Approaches- A Survey", Mar. 23, 2000, University of Southern California, 44 pgs.*
Kemerer, Chris; "An Empirical Validation of Software Cost Estimation Models", May 1987, Management of Computing, vol. 30, No. 5, pp. 416-429, 14 pgs.*
Agarwal et al. ; "Estimating Software projects", Jul. 2001, Software Engineering Notes, vol. 26, No. 4, pp. 60-67.*
Banker et al. Software Development Practices, Software Complexity, and Software Maintenance Performance: A field Study, Apr. 1998, Management Science, pp. 433-450.*

(Continued)

*Primary Examiner*—John W Hayes
*Assistant Examiner*—Freda A Nelson
(74) *Attorney, Agent, or Firm*—Campbell Stephenson LLP

(57) ABSTRACT

A software estimator tool implements an estimation process. The tool implements a bottom-up estimation process and a top-down estimation process. The bottom-up estimation process calculates an cumulative estimated level of effort for selected stages during the implementation of a custom software product, the custom software product being comprised of pre-written generic software modules. The top-down estimation process uses the cumulative estimated level of effort to estimate a schedule and calculate estimated billable revenue for the implementation project.

35 Claims, 25 Drawing Sheets

OTHER PUBLICATIONS

Kemerer, Chris F., "Am Emperical Validation of Software cost Estimation Models", May 1987, Communications of the ACM, vol. 3, No. 5, 13 pgs.*

Boehm et al., "Software Development Cost Estimation Approaches-A survey", 2000, Annuals of Software Engineering 10, pp. 177-205 (29 pgs).*

Kemerer, Chris F., "A Emperical Validation of Software cost Estimation Models", May 1987, Communications of the ACM, vol. 3, No. 5, 13 pgs.*

Heemstra, F. J., "Software Cost Estimation", Oct. 1992, vol. 34, No. 10, 13 pages.*

Boehm et al., "Software Development Cost Estimation Approaches-A survey", 2000, Annuals of Software Engineering 10, pg.*

Abdel-Hamid, Tarek K., "The Dynamics of Software Project Staffing: A System Dynamics Based Simulation Approach", Feb. 1989, IEEE Transactions of Software Engineering, vol. 15, No. 2.*

Krishnan, S. Mayuram; "The Role of Team Factors in Software Cost and Quality an Empirical Analysis Information Technology & People"; 1998, West Linn:. vol. 11, Iss. 1; pg. 20, 9 pgs.*

Mahanti et al., Confluence of Six Sigma, Simulation and Software Development, 2005, Managerial Auditing Journal; vol. 20; Iss 7; pp. 739-762, 24 pgs.*

West Jr., Lawrence A., "Researching the Cost of Information Systems"; Fall 1994, Journal of Management Information Systems, vol. 11, No. 2, pp. 75-107.*

* cited by examiner

RESOURCES & RATES — 950

| | |
|---|---|
| ARCHITECT | 350 |
| CONSULTANT | 245 |
| ENGAGEMENT MANAGER | 365 |
| OTHER 1 | 0 |
| OTHER 2 | 0 |
| OTHER 3 | 0 |
| PRACTICE MANAGER | 325 |
| PRINCIPAL | 290 |
| SENIOR CONSULTANT | 270 |
| SENIOR PRINCIPAL | 350 |

ESTIMATE RANGE*

ESTIMATE SUMMARY

| | EXPENSES | BILLABLE | DURATION** |
|---|---|---|---|
| LOW ESTIMATE | ? | ? | 0 WKS |
| HIGH ESTIMATE | ? | ? | 0 WKS |

*BASED ON TOTAL RANGE VARIANCE FROM ESTIMATION SHEET
**NUMBERS MAY BE LARGER THAN DASH DUE TO FULL WEEK ROUNDING OF RESOURCE USAGE AND USE OF AVERAGES FROM DASH CALCULATIONS.

*FIG. 9B-2*

METHOD AND APPARATUS FOR ESTIMATOR TOOL

BACKGROUND OF THE INVENTION

1. Field of the Invention

The present invention relates to computerized information management and processing systems generally and, more particularly, to a software estimator tool.

2. Description of the Related Art

A fundamental process in the business of providing customized software is the estimation process. Estimation allows a provider of customized software to predict for a customer, in advance, the schedule and costs associated with procurement and installation of the software. For software providers that write custom software code, estimation is often based on the projected number of lines of code that will be written for the customer. What is needed is an estimation process that can estimate the schedule and resources needed to implement a customized software product that consists of pre-existing software modules.

SUMMARY OF THE INVENTION

A software estimator tool that implements an estimation process is provided. The tool implements a bottom-up estimation process and a top-down estimation process. The bottom-up estimation process applies empirically-derived objective data to determine a cumulative estimated level of effort for selected stages in the implementation of a custom software product that is comprised of pre-written generic software components. The bottom-up estimator uses a function point analysis, based upon user-provided function points. These function points include the generic software components to be implemented, as well as the customizations that will be needed. In at least one embodiment, the user ranks the customizations based on anticipated level of complexity. In at least one embodiment, the bottom-up estimation process also determines the personnel types required to perform the estimated effort for the function points, and attributes the estimated effort among the personnel types. Personnel types are sometimes referred to herein as "roles."

Using a cumulative estimated level of effort for selected stages of the implementation project as a baseline, the top-down estimation process generates an estimate of the level of effort required to perform the remaining stages of the implementation project. The top-down estimation process also determines the duration required for each stage of the implementation project, as well as the number of required members for each personnel type that was identified in the bottom-up estimation process. At least one embodiment of the top-down estimation process further provides for estimation of the billable revenue (from the provider's point of view) or cost (from the customer's point of view) as well as taxes and expenses.

During the calculations performed in the top-down process, the cumulative estimated level of effort for the selected stages considered in the bottom-up estimation process may be altered. In such case, the top-down estimation process is performed iteratively in order to take such modifications into account.

After the bottom-up and top-down estimation processes have been performed, the user may make modifications to various parameters in order to revise the estimate. Accordingly, the estimator tool may be run iteratively in order to take varying parameter values into account.

In at least one embodiment, a method comprises receiving data to represent a plurality of function points, determining an estimated value for each of the function points, and performing a function point analysis to determine a cumulative estimated level of effort for the plurality of function points. Each of the function points represents work to be performed to implement a custom software product, the custom software product being comprised of a plurality of pre-written generic software modules.

In at least one other embodiment, a method comprises determining a plurality of stages required to implement a custom software product, the custom software product being comprised of a plurality of pre-written generic software modules. The method further comprises calculating, based upon a cumulative estimated level of effort for selected stages, a duration for each stage value. The method further comprises determining a duration value for each of a plurality of personnel types and attributing one or more resources for each personnel type having a non-zero duration value. The method further comprises scheduling the stages and attributing a billable rate to each resource. The method further comprises calculating a billable revenue value for implementation of the custom software product and providing for display of the billable revenue value.

BRIEF DESCRIPTION OF THE DRAWINGS

The present invention may be better understood, and it's numerous objects, features, and advantages made apparent to those skilled in the art by referencing the accompanying drawings, in which:

FIGS. 6A and 6B are exemplary screen displays illustrating an interface that provides and receives stage duration information during a planning operation.

FIG. 8 is an exemplary screen display illustrating an interface that provides and receives resource planning information during a planning operation.

The use of the same reference number throughout the Figures designates a like or similar element.

Figure 1:
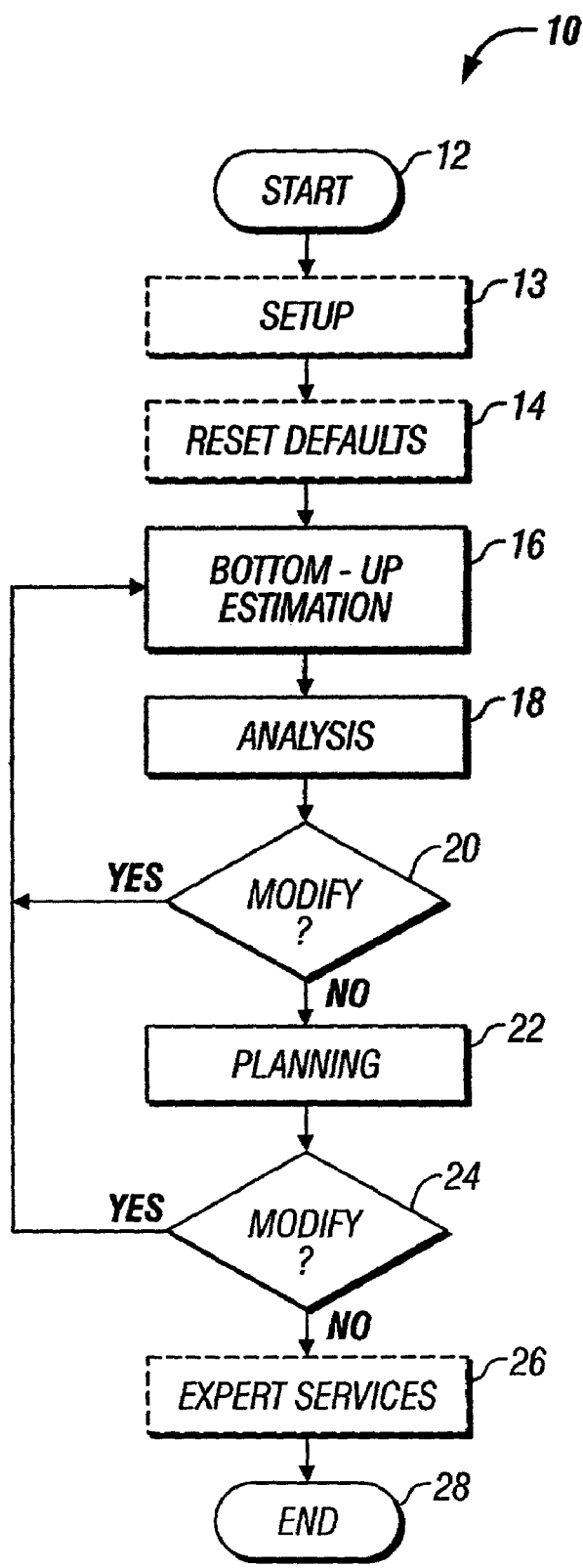
FIG. 1 is a flowchart illustrating a method of performing at least one embodiment of an estimation process.

While the invention is susceptible to various modifications and alternative forms, specific embodiments thereof are shown by way of example in the drawings and will herein be described in detail, it should be understood, however, that the drawings and detailed description are not intended to limit the invention to the particular form disclosed. On the contrary, the intention is to cover all modifications, equivalents, and alternatives falling within the true spirit and scope of the present invention as defined by the appended claims.

DETAILED DESCRIPTION

The following sets forth a detailed description of an embodiment of an estimator tool and should not be taken to be limiting of the invention itself. Rather, any number of variations may fall within the scope of the invention, which is defined in the claims following the description.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Overview

FIG. 1 is a flowchart illustrating a method 10 of performing at least one embodiment of an estimation process. The method 10 illustrated in FIG. 1 provides an estimation of effort, duration, resources, and budget for a software implementation project. The method 10 begins at operation 12 and proceeds to an optional setup operation 13. The setup operation 13 determines user-preferred default settings for various parameters, such as configuration efforts, module options, resource rates, and factors. Operation proceeds to optional operation 14, in which parameter values are reset to the user-defined defaults determined in the setup operation 13.

In operation 16, a bottom-up estimation process 16 is performed. The bottom-up estimation process applies empirically-gathered objective data to user-provided function points to determine an estimated level of effort ("LOE") for selected stages required for the implementation of one or more pre-written software modules. The bottom-up estimation process 16 also determines the types of personnel needed to accomplish the effort represented by the function points, and attributes the estimated LOE among those personnel types. The bottom-up estimation process 16 also supports the application of additional factors to the estimated LOE value in order to increase or decrease the estimated LOE, or to provide a range of values of the estimated LOE.

An analysis operation 18 generates a display graphic which, when presented to a user, displays the estimated LOE in graphic format. In at least one embodiment, a display 500 (FIG. 5) generated in the analysis operation 18 illustrates two graphic views of the estimated LOE: 1) hours per configuration-change complexity and 2) hours per top 5 modules of effort.

Accordingly, in operations 16 and 18 the estimated LOE is generated and displayed. The estimated LOE is generated using a bottom-up approach that applies objective data to user-defined modules and enhancements, and such estimated LOE is displayed to the user. Also, the estimated LOE is attributed among personnel types.

If the user chooses, in operation 20, to modify the selected function points, processing returns to operation 16. This may occur, for instance, when a user decides to follow suggestions provided during the analysis operation 18, as is further discussed below in connection with FIG. 5. If the user does not choose, in operation 20, to modify the function points, then processing proceeds to operation 22.

In operation 22, a planning operation 22 is performed. In the planning operation 22, resource information is received from a user via a planning interface display. Using this resource information, a top-down estimation is performed, wherein the resource information is applied against the estimated LOE to determine duration, staffing needs, expenses, revenues, and the like. The estimate values for duration, staffing needs, expenses, revenues, taxes, etc. are displayed to the user.

Based upon the values calculated and displayed during the planning operation 22, the user may desire to revise the parameters utilized in such calculations. For instance, the user may wish to revise the function points as selected during the bottom-up estimation operation 16. Also for example, the user may wish to revise maximum duration values, hours per day, week, or month worked, productivity factor, and/or hourly rates assigned to human resources. If the user indicates a desire to modify any parameters, the evaluation in operation 24 evaluates to "yes." In such case, processing loops back to the bottom-up estimation process 16. Otherwise, processing continues at operation 26.

In operation 26, an expert services operation 26 is performed. The optional expert services operation 26 provides guidance to a user regarding how to plan for Expert Services reviews in the overall project estimate.

Bottom-Up Estimation Process

Figure 2:
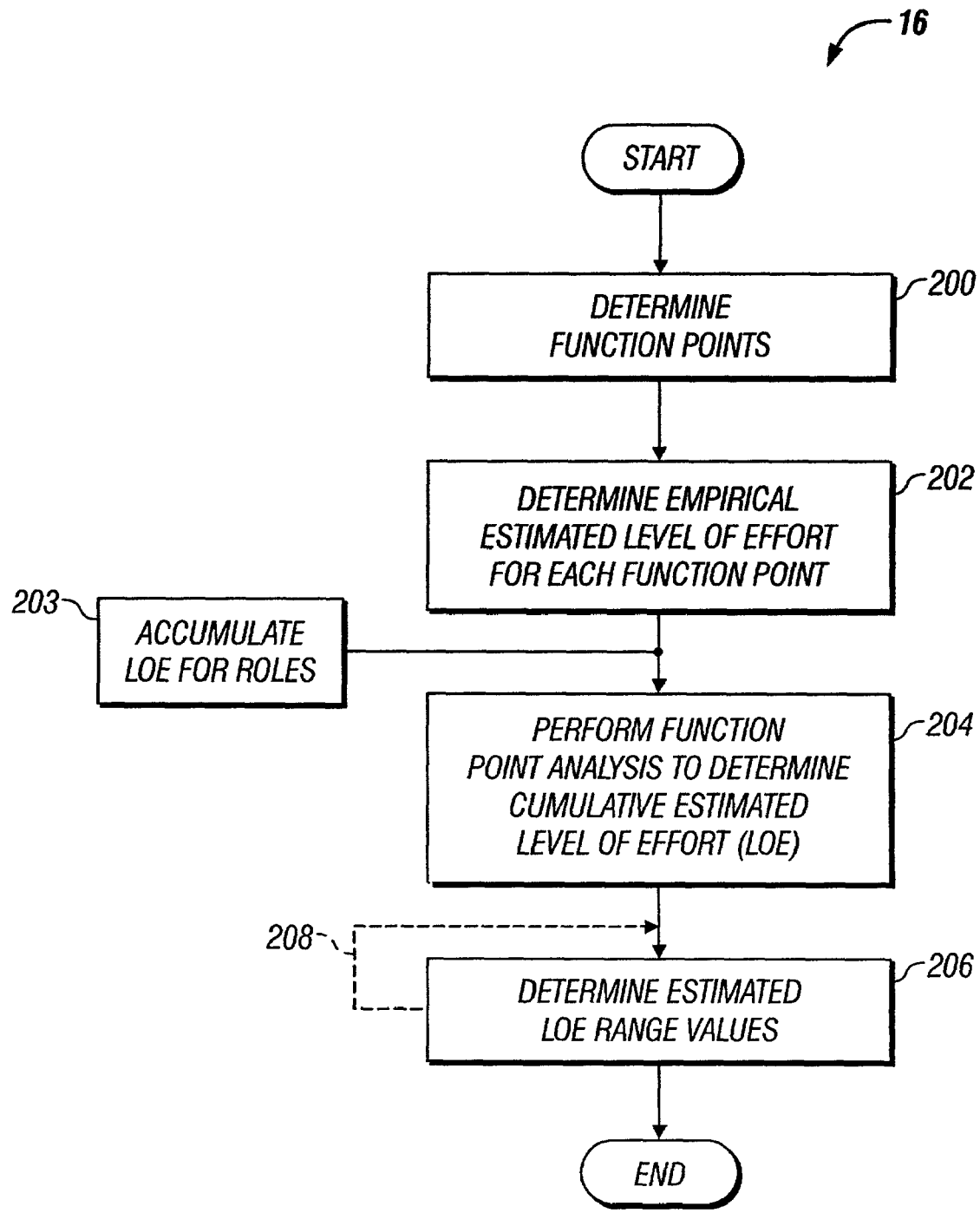
FIG. 2 is a flowchart illustrating a method for performing a bottom-up estimation process in accordance with at least one embodiment of the present invention.

FIG. 2 is a flowchart illustrating a method 16 for implementing a bottom-up estimation process. In at least one embodiment, the bottom-up estimation method 16 is implemented in software that provides for the functionality described herein. The method 16 utilizes function point analysis to generate an estimated level of effort for user-defined function points. Function point analysis provides that a project to be estimated is divided into units (or "function points"), where each function point is associated with an estimated level of effort. The estimates for the function points are summed in order to determine a cumulated LOE estimate. In at least one embodiment of the bottom-up estimation method 16, the user is prompted for function points relevant to selected stages of the total implementation project. As used herein, the term "implementation project" refers to the total effort required to design, develop, configure, and unit test the custom software project, as well as to define requirements for the project, discover the differences between the functionality desired by the customer and the base functionality of the selected modules, validate, and deploy the custom software. In at least one embodiment, the bottom-up estimation process calculates an estimated level of effort for selected stages of the implementation project, the selected stages encompassing the design, development, configuration, and unit testing tasks. One skilled in the art will recognize that such tasks may be referred to by alternative nomenclatures, and that they may be combined into broader categories. In at least one embodiment, such tasks are collectively referred to as the Design and Configure stages of an implementation project.

Figure 3A:
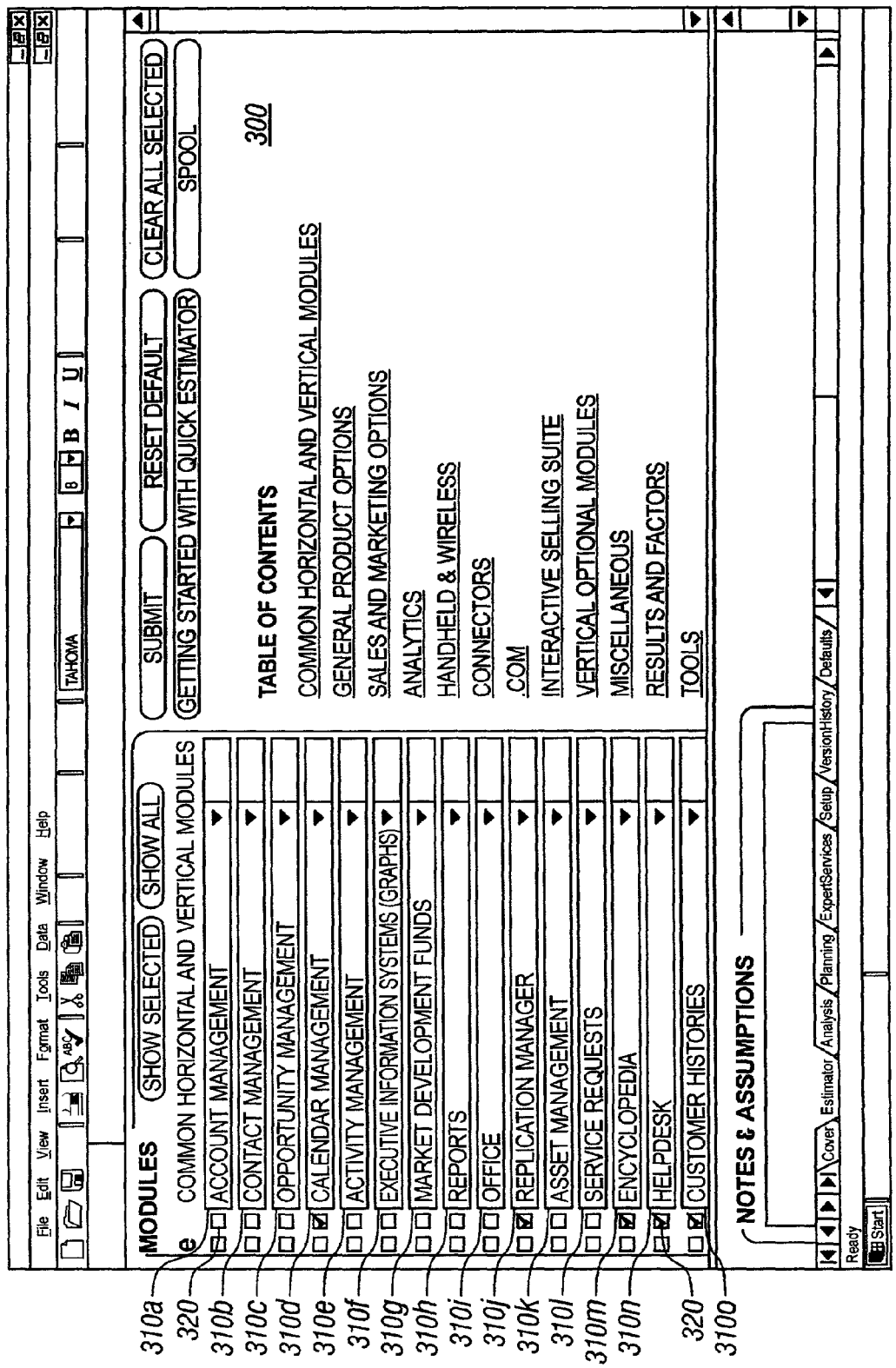
FIGS. 3A and 3B are exemplary screen displays illustrating an interface that provides for receiving function point information for a bottom-up estimator in accordance with at least one embodiment of the present invention.
Figure 3B:
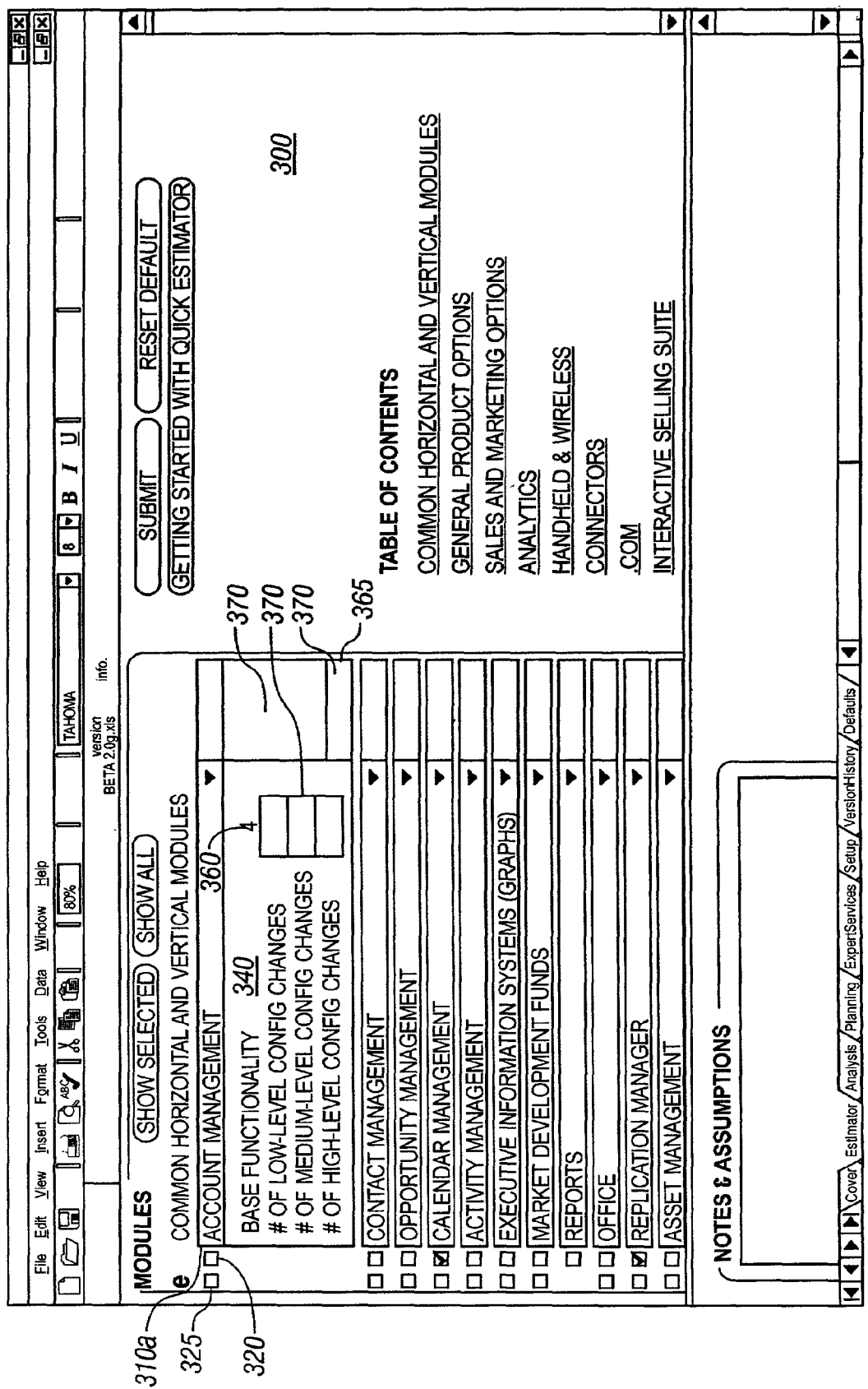
Figure 3C:
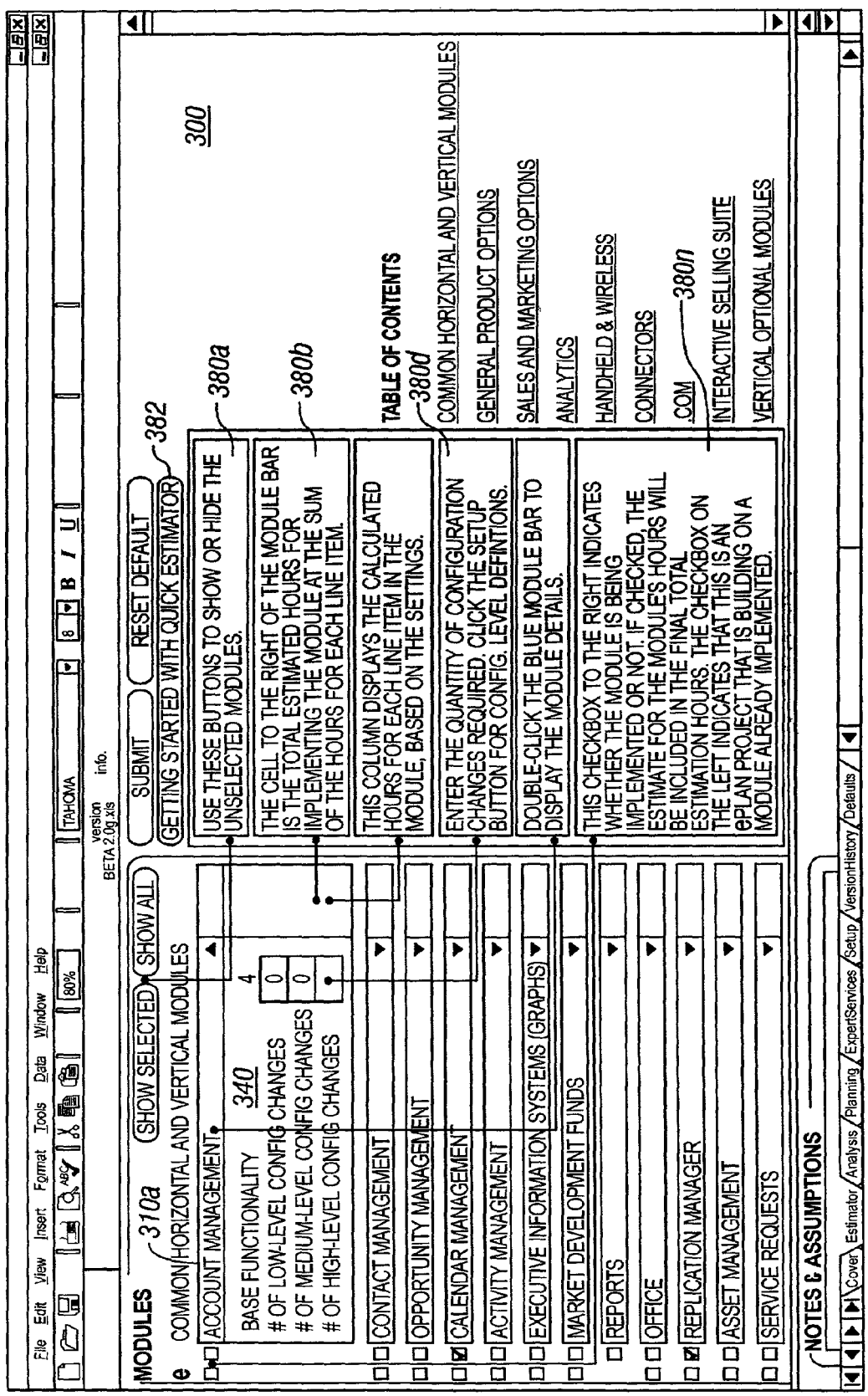
FIG. 3C is an exemplary screen display illustrating an interface that provides for receiving function point information for a bottom-up estimator in accordance with at least one embodiment of the present invention, wherein the interface further provides "getting started" guidance.

FIGS. 3A, 3B, and 3C are relevant to the discussion of the bottom-up estimation process 16 illustrated in FIG. 2. FIGS. 3A, 3B, and 3C are exemplary screen displays illustrating an interface that provides for receiving function point information for a bottom-up process 16 in accordance with at least one embodiment of the present invention.

FIGS. 2 and 3A illustrate that in operation 200, the function points are gathered from the user. FIG. 3A illustrates that a list of potential function points is presented to the user, in at least one embodiment, via an estimator screen display 300. The list of function points includes textual representations 310*a* through 310*o* of generic software components, referred to as "modules." Various ones of the generic software component representations 310*a* through 310*o* may be selected by the user in order to reflect the generic software modules to be implemented in the customized software product at issue.

Figure 11:
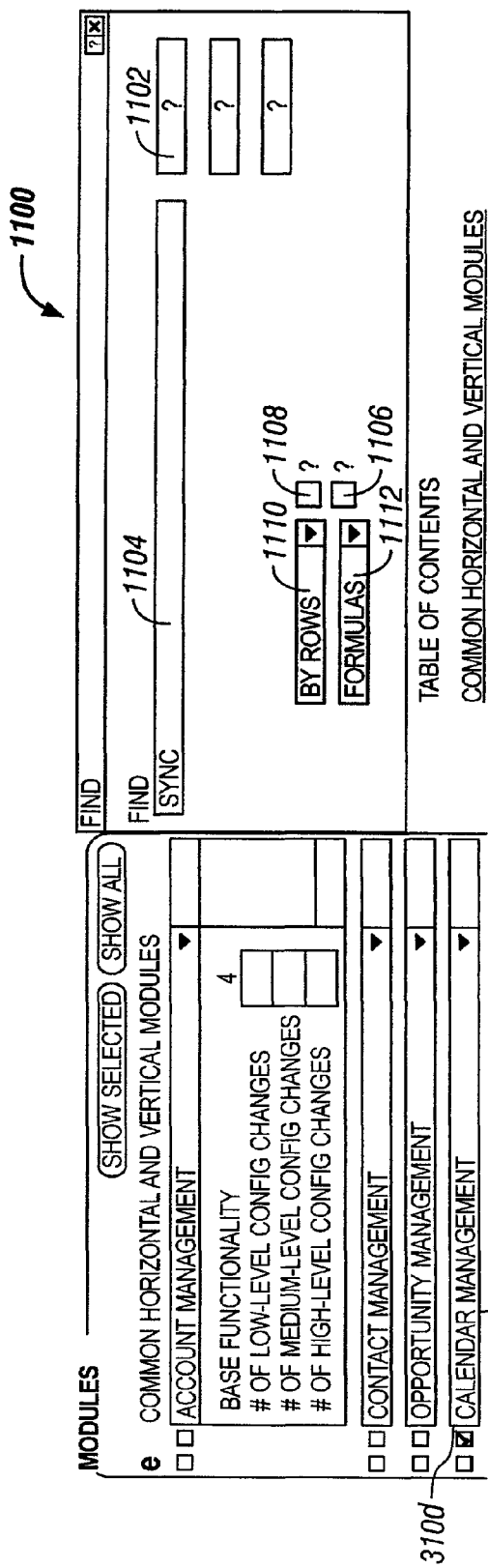
FIG. 11 is an exemplary screen display illustrating an interface that provides and receives search information during a bottom-up estimation process.

Brief reference to FIG. 11 illustrates an alternative "Find" feature via which a user may locate modules to be implemented in the customized software product at issue. FIG. 11 is an exemplary screen display 1100 illustrating an interface that provides and receives search information during a bottom-up estimation process. A user may enter a module name or other search string in a search window 1104. Additional search criteria may be entered in other display areas 1106, 1108, 1110, and 1112. When the user wishes to activate the search, the user does so by activating the "find next" selection box 1102. Based on the module name and other criteria entered in display areas 1104, 1106, 1108, 1110, and 1112, a search is performed. In at least one embodiment, a display differentiator, such as an underscore display 1114, indicates that the module matching the search criteria is associated with the underscored module representation 310*d*. In a preferred embodiment, the underscore display 1114 indicates that the user should select the module representation 310*d* in order to activate a drop-down display box that contains a representation of the module matching the search criteria.

Returning to FIGS. 2 and 3A for purposes of example, assume that the user selects the Account Management module display 310*a* in order to indicate that the Account Management module is to be included in the bottom-up estimated LOE calculation. One skilled in the art will recognize that any known selection mechanism may be employed in order to convey the user's selection action to the bottom-up estimator software. In at least one embodiment, the user selects a module representation 310 by activating a selection box 320 associated with the module. Such activation can be accomplished, for example, by clicking on the selection box 320 with a mouse. In at least one other embodiment, the user selects the module 310*a* by highlighting the module on the estimator display 300 and clicking it with a mouse.

One should note that, in a preferred embodiment, these two selection mechanisms result in different functions. FIG. 3B illustrates that activating a selection box 320 results in the represented module 310*a* being selected as a function point for the analysis. Highlighting and selecting a module representation 310*a* reveals a drop-down box 340 via which a user can enter additional function points related to the module 310*a*. It should also be noted that, in at least one embodiment, two selection boxes 320, 325 are displayed for a module representation 310*a*. Activation of the selection box 320 results in the selection of a module's base functionality as well as any configuration changes, to be accounted for in the level-of-effort calculation. However, activation of the alternative selection box 325 effects the result that only configuration changes, but not base functionality, of a module is considered in the level-of-effort calculation. Accordingly, the cumulative estimated LOE may be calculated regarding configuration changes to a module that a customer already has in place.

FIGS. 2 and 3B illustrate that, for each module representation 310 selected by the user from the display screen, it is determined in operation 200 that the user has selected that module as a function point. FIG. 3B illustrates that a drop-down box 340 provides additional opportunity for a user to select function points associated with a selected module. For each selected module, the user may further select one or more configuration changes to be performed in order to enhance the base functionality of the selected module. In at least one embodiment, the user determines the level of complexity required for each desired configuration change. The user indicates the level of complexity by incrementing a value associated with the particular complexity level for the selected module.

Figures 1, 3D:
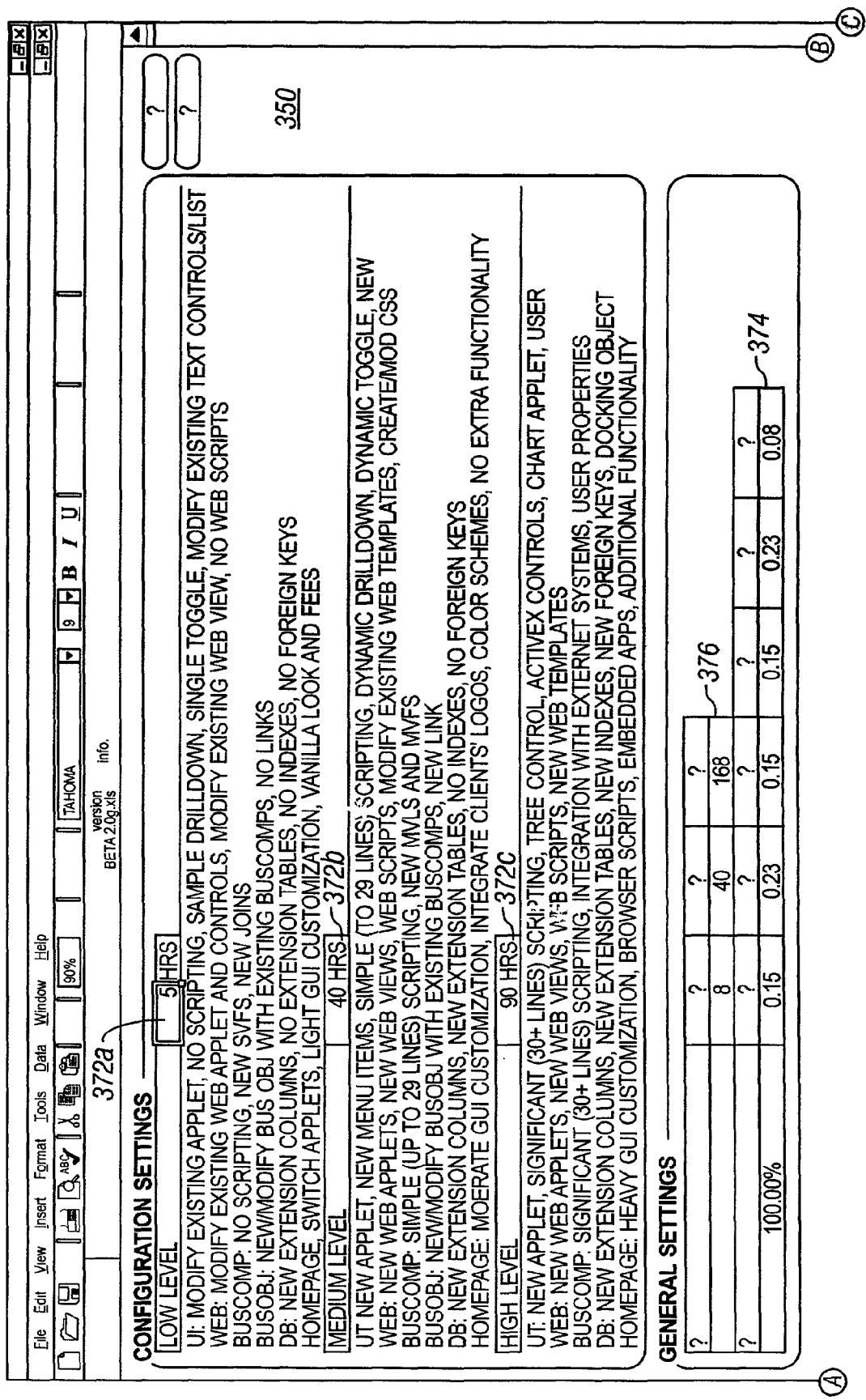
FIG. 3D is an exemplary screen display illustrating an interface that provides an interface for receiving user-provided default settings, referred to herein as a "setup" display.
Figures 2, 3D:
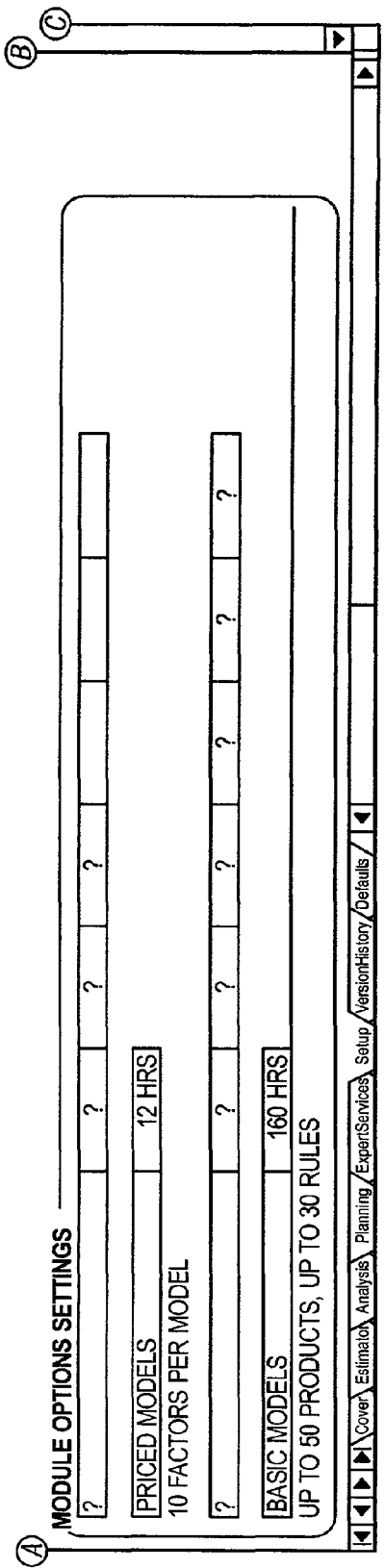

FIG. 3D illustrates an exemplary setup display screen 350 that may be generated during the bottom-up estimation process 16. The display screen 350 imparts to the user guidance regarding how to classify the level of complexity for a desired configuration change. FIG. 3D illustrates, for instance, that a low level configuration change to the user interface (UI) for a module is defined to involve no scripting whereas a high level configuration change to the UI for a module is defined to involve significant scripting involving thirty (30) or more lines of script language code.

FIGS. 2, 3B, and 3C illustrate that, in operation 202, an estimated level of effort value for each function point is determined based on objective empirical data. For instance, the base functionality of the generic software component "Account Management," represented by text representation 310*a* on the display screen 300, is determined in operation 202 to require a level of effort of four (4) hours, as shown in display area 360. (The user may select various units for the LOE values displayed on the display screen 300, including units of, for instance, days, hours, weeks, or months). In operation 202, the estimated level of effort for configuration changes is also determined, based on empirical data. For instance, the estimated LOE for a low-level configuration change is determined to be five (5) hours, the estimated LOE for a medium-level configuration change is determined to be forty (40) hours, and the estimated LOE for a high-level configuration change is determined to be ninety (90) hours.

In operation 203, a "role," or personnel type, is determined for each function point. For each level of complexity per module, a total effort 370 is determined by multiplying the desired number of changes for that level (as entered by the user in area 365 of the display screen 300) by the estimated LOE for that particular complexity level. This total effort 370 is attributed to the role determined for the function points reflected in the total effort 370.

In operation 204, a function point analysis is performed in order to determine a cumulative estimated level of effort (LOE) for all of the function points determined in operation 200. The LOE for all selected modules and configuration changes is summed in operation 204 in order to derive a cumulative estimated LOE.

Figure 4:
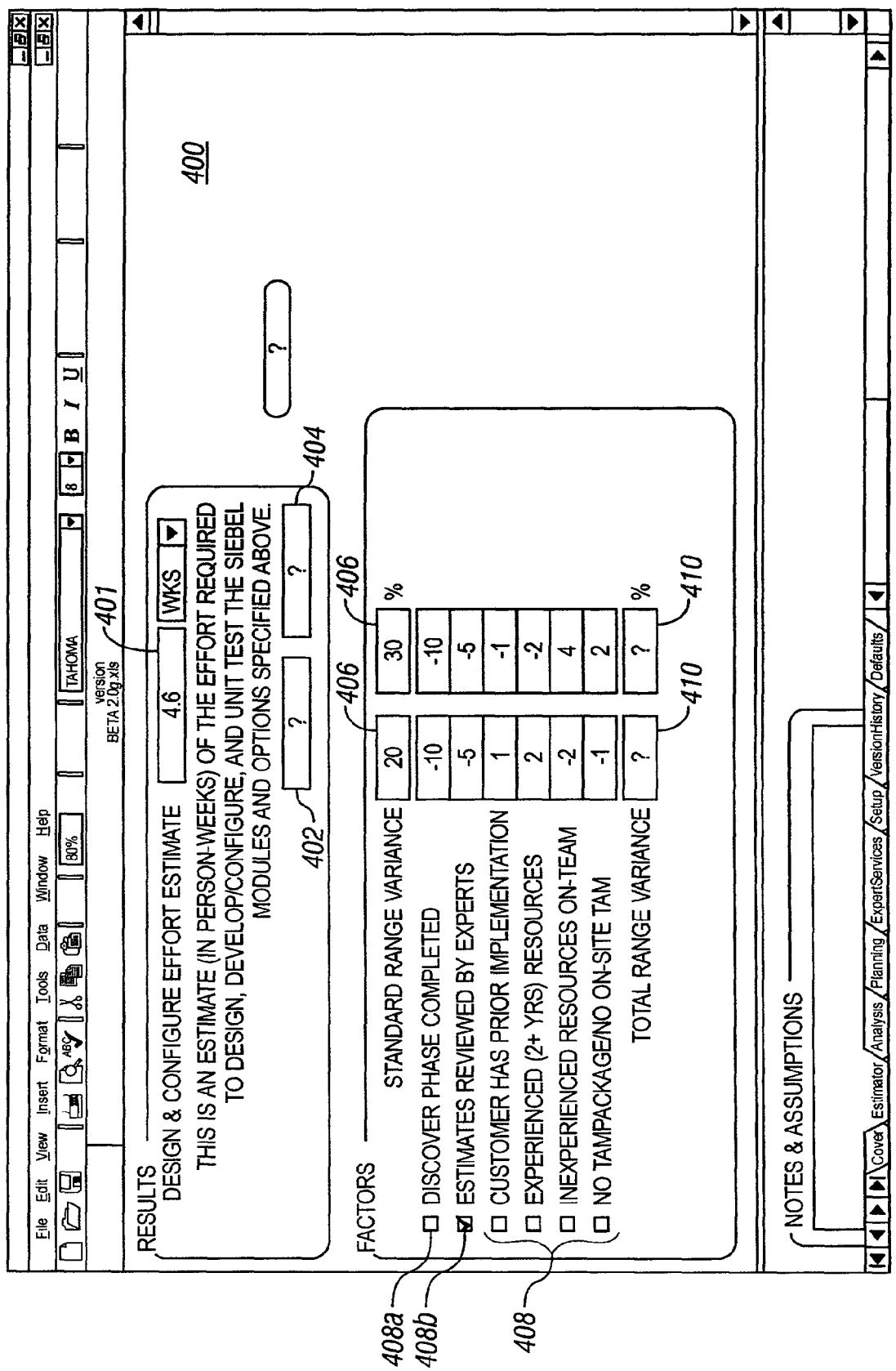
FIG. 4 is an exemplary screen display illustrating an interface that provides information concerning cumulative estimated level of effort for design and configuration stages of an implementation project as well as providing information regarding range variance and providing for receipt of information from the user regarding range variance factors.

FIGS. 2 and 4 illustrate that the cumulative estimated LOE is further refined, in operation 206, to take a range variance into account. FIG. 4 illustrates an exemplary display screen 400 via which the cumulative estimated LOE is displayed to the user. The cumulative estimated LOE is displayed in an LOE display area 401. In addition, a lower range is displayed in a lower range display area 402 and a higher range is displayed in a higher range display area 404.

The lower range represents a percentage by which the project is likely to have an estimate underrun (e.g., cost less, take less time). The higher range represents a percentage by which the project is likely to have an estimate overrun (e.g., cost more, take more time).

The range is calculated in operation 206. In at least one embodiment, the range is calculated based on a standard range variance that is displayed in a range variance display area 406 on the display screen 400. In at least one embodiment, the standard range variance for a cumulative estimated LOB value X is X−20% to X+30%. Accordingly, for the exemplary cumulative estimated LOE of 4.6 weeks illustrated in FIG. 4, the low range value would be X−(0.20X) or 4.6−(0.92)=3.68 and the high range value would be X+(0.30X) or 4.6+(1.38)=5.98. On a first path through operation 206, such values are displayed in a lower range display area 402 and an higher range display area 404, respectively.

FIG. 2 illustrates that the range values can be modified via optional path 208, based on user selection of variance factors 408. In the example illustrated in FIG. 4, the user has selected a variance factor 408b to indicate that experts have reviewed the estimate. Accordingly, the process requires that the lower and higher range variances be reduced by five percent. Accordingly, a modified range variance of 15-25% is displayed in a total range variance display area 410. Based on the modified range variance that is recalculated in operation 206 as a result of taking optional path 208, a lower range is displayed in lower range display area 402 and an higher range is displayed in higher range display area 404. The lower range displayed in area 402 is calculated in operation 206 as 4.6−(0.15×4.6)=3.91 (rounded down to 3.9). The higher range displayed in area 404 is calculated in operation 206 as 4.6+(0.25×4.6)=5.75 (rounded up to 5.8). One skilled in the art will recognize that any variance factors may be reflected on the display screen 400 and taken into account in operation 206. One skilled in the art will further recognize that alternative values for the variance factors may be utilized without departing from the functionality described herein.

Regarding the types of variance factors that are taken into account during operation 206, one skilled in the art will recognize that at least two types of range factors are disclosed in FIG. 4. Two of the factors listed, "Discover phase completed" and "Estimates reviewed by experts" influence the confidence of the estimate. That is, they result in a smaller range by deducting the same value from the initial upper and lower range estimates, thereby resulting a smaller difference between the higher and lower range values. The remaining factors, when taken into account in operation 206, either decrease the confidence of the estimate by increasing the range, or merely shift the lower and higher range values by the same percentage.

Briefly returning to FIG. 1, one can see that an analysis operation is performed in operation 18. In the analysis operation 18, a display screen is generated.

Figure 5:
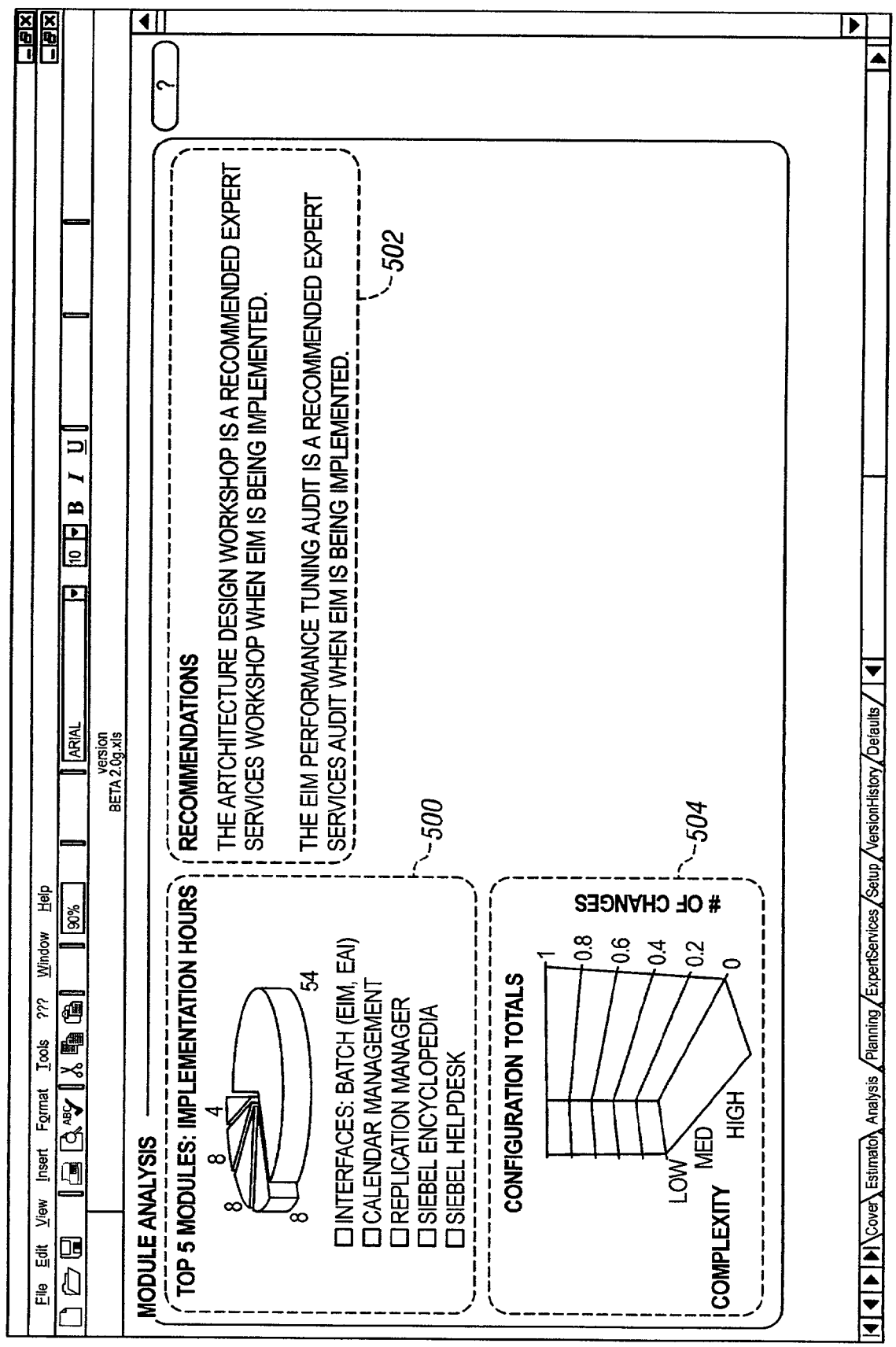
FIG. 5 is an exemplary display screen illustrating an interface that provides graphical information generated during an analysis operation.

FIG. 5 illustrates an exemplary display screen 500 showing various display areas generated as a result of the analysis operation 18 (FIG. 1). In a first display area 500 a graphical pie chart is displayed. The pie chart represents the implementation hours required for the five most time-consuming modules chosen by the user in operation 16 (FIG. 1). In at least one embodiment, the pie chart displayed in the first display area 500 reflects the effort required to perform Design and Configuration for the five modules displayed therein.

In the second display area 504, a bar graph reflects the effort required for the user-selected low-, medium-, and high-level configuration changes for each of the five modules displayed in the pie chart.

FIGS. 1 and 5 illustrate that, in display area 502, recommendations are displayed to the user. The recommendations are determined in operation 18 based on the function points previously selected by the user. For instance, it may be determined that, for a module selected by the user, a particular workshop, audit, or design review is recommended. If the user chooses, in operation 20, to modify the selected functions points based on the recommendations displayed in display area 502, operation returns to operation 16 so that the user may modify the function point selection, if desired. If the user does not desire to make modifications in operation 20, the processing proceeds to the planning operation 22.

Top-Down Estimation Process

Figure 6A:
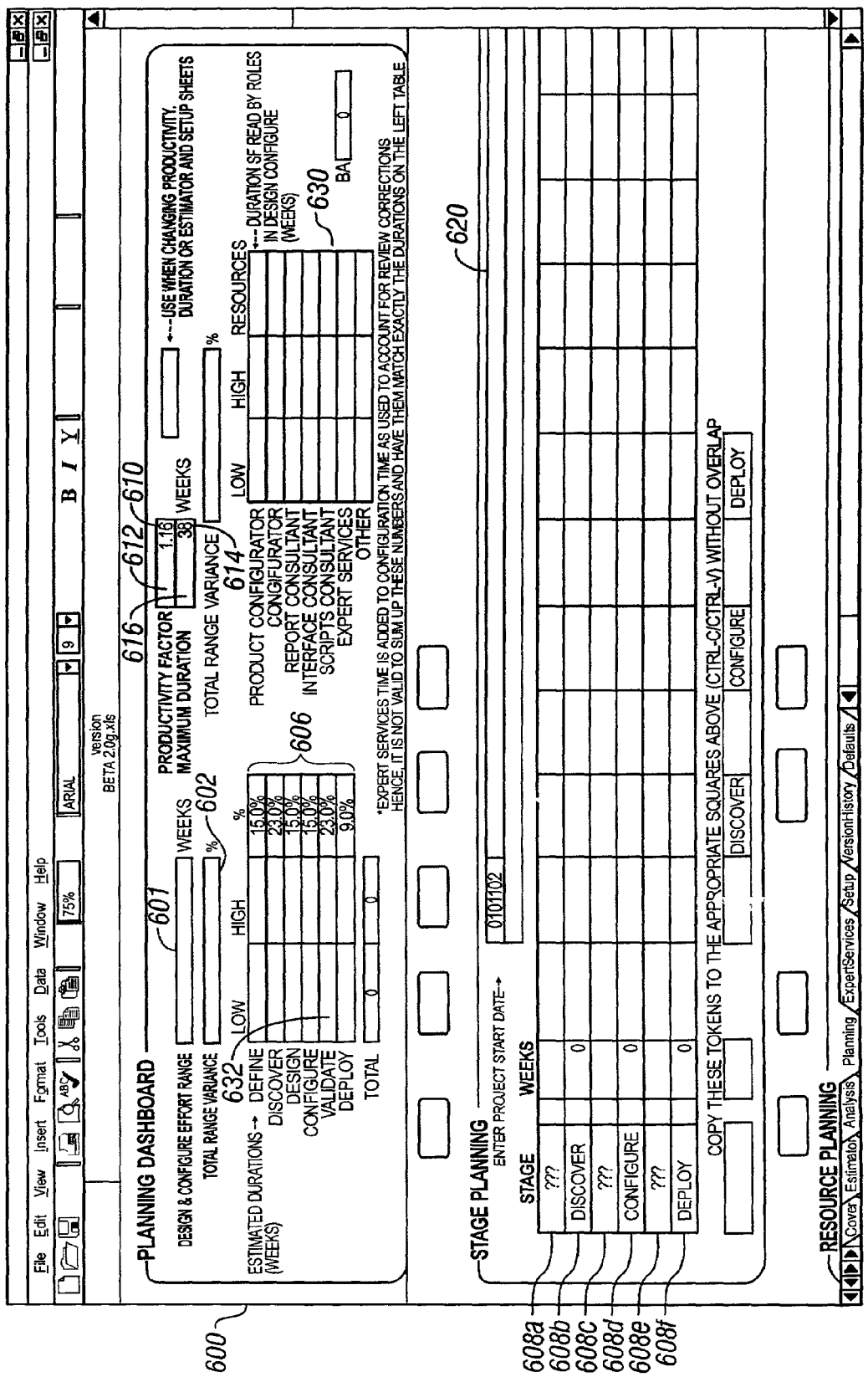
Figure 6B:
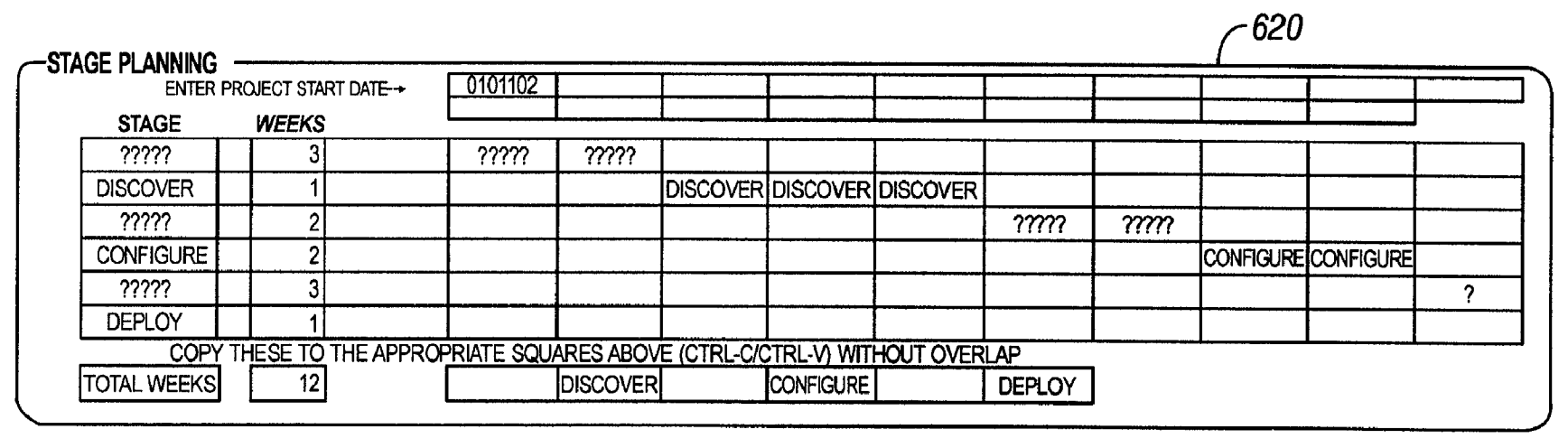
Figures 7, 7A:
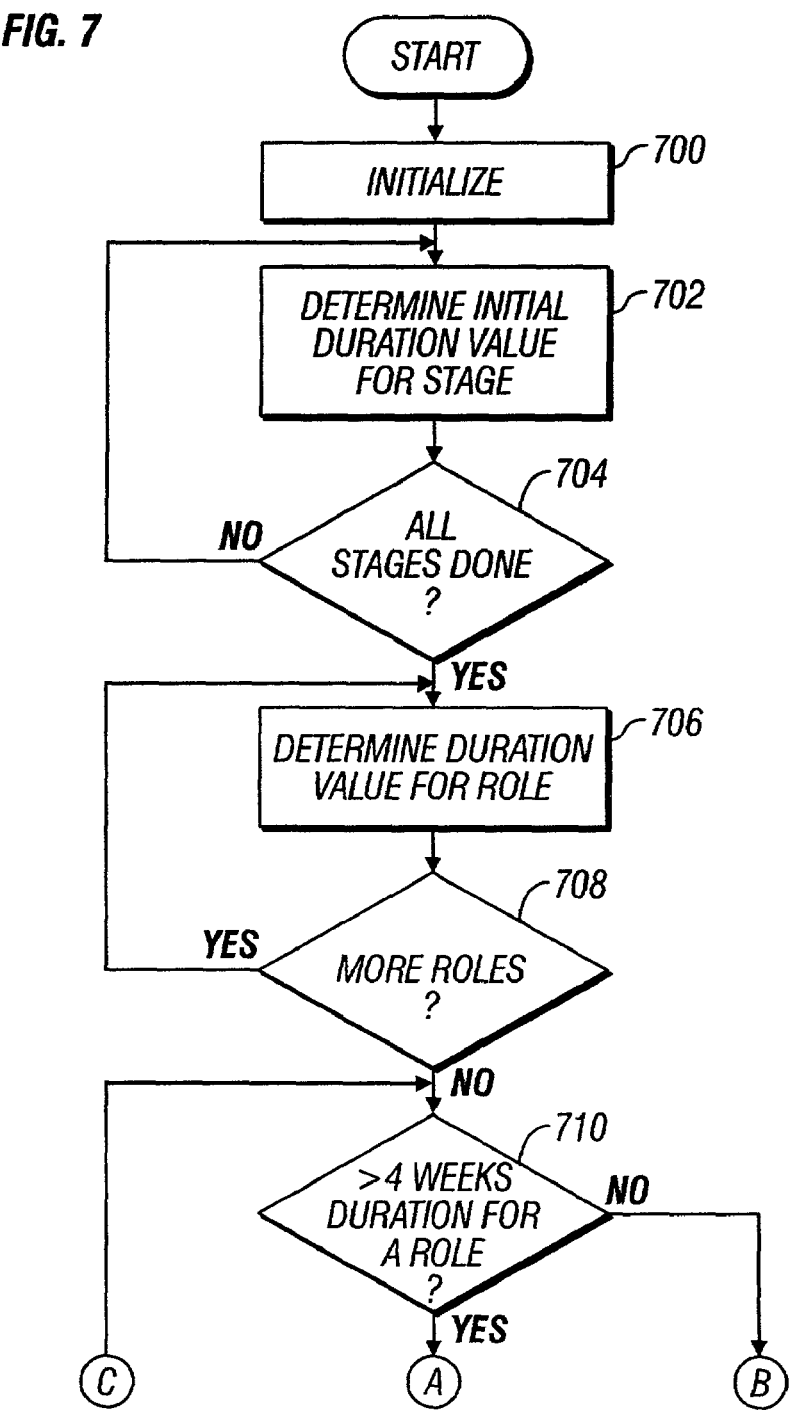
FIG. 7, including
FIGS. 7A, 7B, and 7C, is a flowchart illustrating a method of performing at least one embodiment of a planning operation.
Figure 7B:
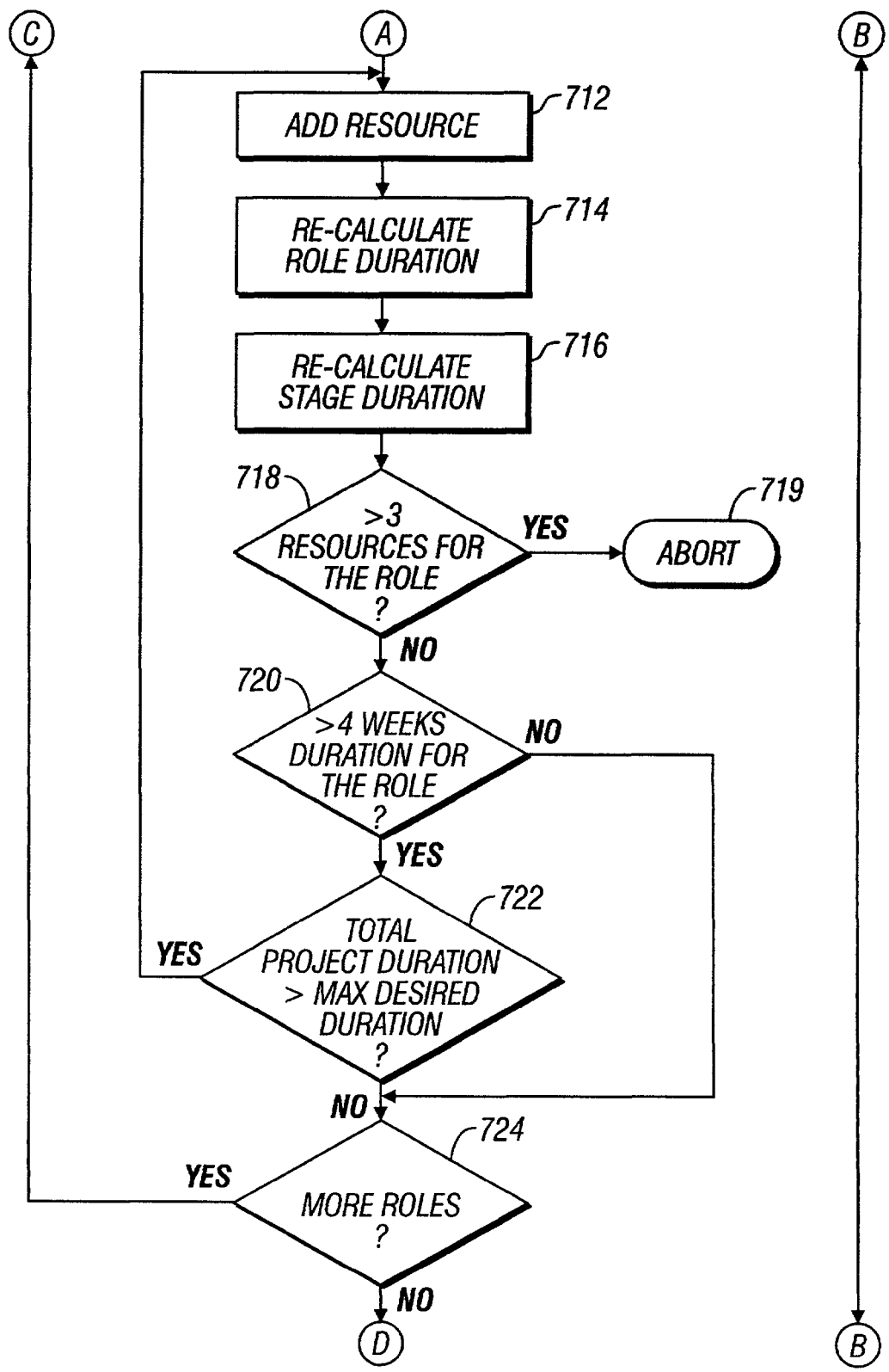
Figure 7C:
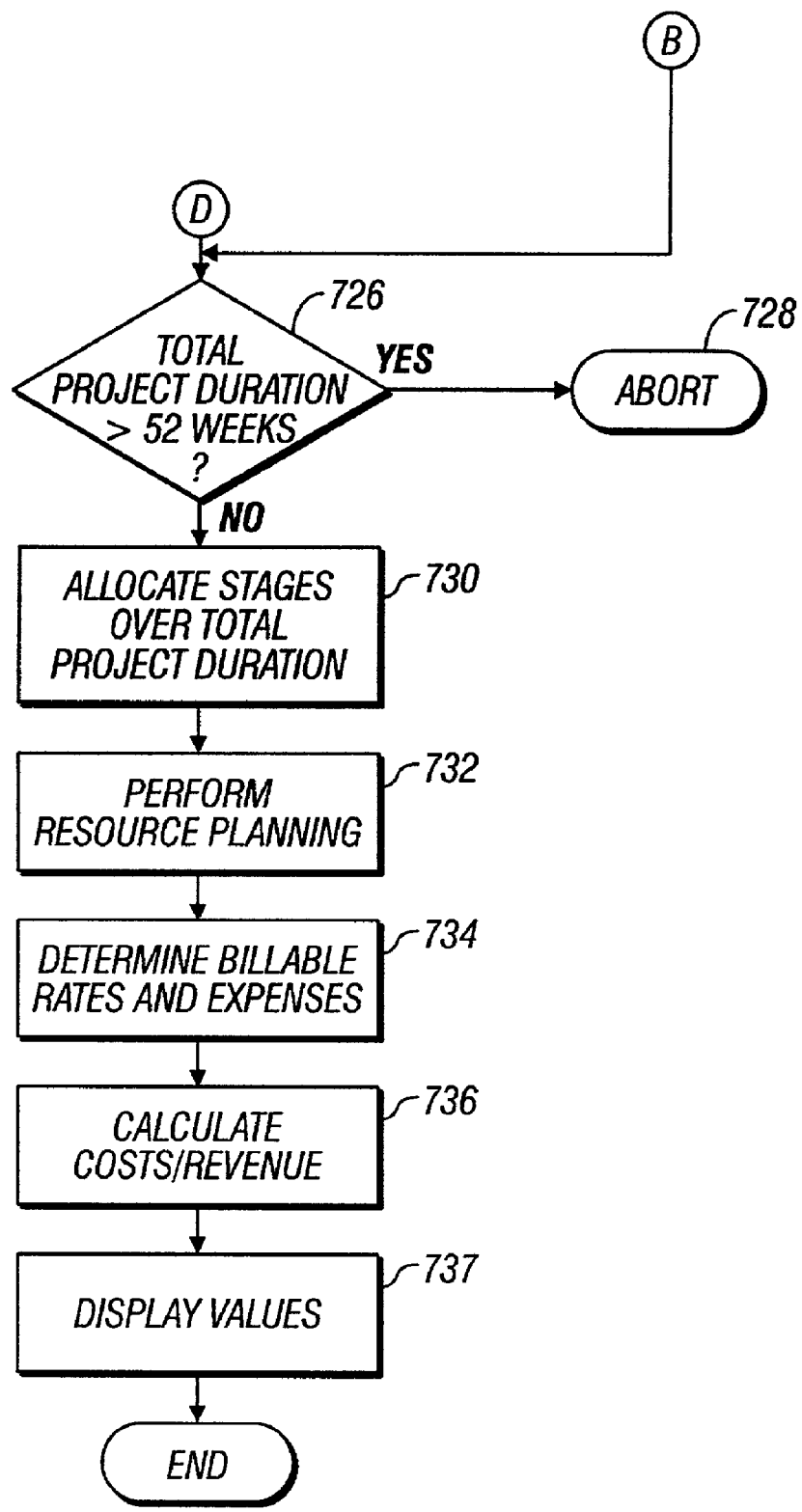

FIGS. 4, 6A, 6B, and 7, including FIGS. 7A, 7B, and 7C, further illustrate the planning operation 22 (FIG. 1). FIGS. 6A and 6B are exemplary screen displays that may be utilized to illustrate to the user the results of operations performed during the planning operation 22. During the planning operation 22, a schedule is set forth such that each of the stages is attributed a time slot in the overall project schedule. Also, human resources are allocated for each role, and the duration and hourly cost of such allocations are calculated. In addition, the expenses associated with the implementation project are determined.

In operation 700, initialization takes place. Most fields of a display screen 600 are reset to default parameters and the units for level-of-effort calculations is set to "weeks." During the initialization operation 700, a Design and Configure effort range area 601 is populated with the total range variance figures that were calculated in operation 206 (FIG. 2) and displayed in the lower range area 402 and higher range area 404. First and second total range variance display areas, 602 and 604, respectively, are populated with the total range variance previously calculated in operation 206 (FIG. 2) and displayed in the total range variance display area 410. During the initialization operation 700, the total implementation project is conceptually divided into arbitrary "stages" 608a through 608f, and an estimated percentage is assigned to each stage 608. The estimated percentage assigned to each stage is, in at least one embodiment, based on a "rule of thumb" regarding effort required for software projects, the rule of thumb being based on empirical observation of historical data. Accordingly, a Define stage is assigned a percentage of 15%, a Discover stage is assigned a percentage of 23%, the Design stage is assigned a percentage of 15%, the Configure Stage is assigned a percentage of 15%, a Validate stage is assigned a value of 23%, and a Deploy stage is assigned a value of 9%. The sum of the stages represents the total effort (i.e., 100%) required for the implementation project. These stages and their associated percentages are displayed in a percentage display area 606.

A default productivity factor value 610 is determined and is displayed in a productivity factor display area 612. In other words, because human resources are not available for all weeks of a year, and are not usually productive for 100% of the time that they are "on the job," the duration value usually exceeds the estimated level of effort assigned to a resource. In the United States, for instance, the inventors have determined, based on empirical data, that a human resource usually works only about 45 of the 52 weeks in a year and is productive for about 6.7 hours out of an 8-hour work day. Accordingly, in at least one embodiment, the default productivity factor value is set to a value of 1.16. The user may override the default by entering a different productivity factor value in the 610 (FIG. 6A)

If the current value in the productivity factor is less than one (based, for instance, on prior user input), then the value is set to one during the initialization operation 700. Also during the initialization operation 700, a maximum desired duration value 614 is initialized and is displayed in a maximum desired duration display area 616. In at least one embodiment, if the current value of the maximum desired duration value is less than 13, it is initialized to 13, and if the maximum desired duration value is greater than 52, it is initialized to 52.

In operation 702, initial duration values for each of the stages 608 are calculated. Using the numbers shown in the Design and Configure effort range area 601, the high and low range of estimated effort for the Design and Configure stages are determined. For example, using the values displayed in FIG. 6A, one can determine that the Design and Configure stages collectively are attributed 30% of the effort required for the implementation project, as reflected in the percentage display area 606. One can also determine that the Design and Configure stage is estimated to required a LOE of 3.9 to 5.8 weeks. Accordingly, one can calculate that a lower-range estimate of the effort required for the Design and Configure stages equals 3.8 weeks and a higher-end estimate equals 5.8 weeks. Knowing that these values represent 30% of the total effort required for the implementation effort, the low and high estimates for the other stages may be calculated algebraically. If 30% of the total is 3.9, then the lower-range total effort required for the implementation project can be calculated as: 3.9/0.3=13. Likewise, the higher-end total effort required for the implementation project can be calculated as: 5.8/0.3=19.3. The low and high estimates for the other stages can be calculated as follows:

Define: 0.15(13)=1.95; 0.15(19.3)=2.9

Discover: 0.23(13)=3; 0.23(19.3)=4.4

Validate: 0.23(13)=3; 0.23(19.3)=4.4

Deploy: 0.09(13)=1.2; 0.09(19.3)=1.7

In operation 702, each of these high and low estimates is multiplied by the productivity factor value 610 in order to determine initial duration values for each stage 608. Operations 702 and 704 are performed iteratively until a high and low initial duration estimate has been calculated for each stage 608. Once the duration has been calculated for each stage, an average duration is calculated ((low estimate+high estimate)/2).

In operation 706 a duration for each role is calculated. While such information is not displayed to the user until operation 737, reference will be made to the resource display area 630 in FIG. 6A in order to clarify the following discussion. The cumulative LOE previously calculated for a role in operation 203 (FIG. 2) is utilized in operation 706. The total range variance (reflected in the second total range variance display area 604) is applied to each non-zero LOE value in order to determine a low estimate and high estimate for each role. The productivity factor 610 is then applied to each low and high estimate, in order to derive a low and high initial duration estimate for each role having non-zero estimated LOE. In operation 706, if the duration value for a role is a non-zero value, then the resource value associated with that role is assigned to "1;" that is, at least one human resource will be required to perform the effort required for the role. If the duration value for a role is calculated to be zero, then the resource value associated with the role is assigned to "0." Operations 706 and 708 are performed iteratively until the initial duration for all roles has been calculated.

FIG. 7B illustrates that it is determined in operation 710 whether any role has an average (i.e., average of low and high estimates) initial duration estimate of more than four (4) weeks. If so, processing continues at operation 712 in order to apply more resources to the role, thereby decreasing the duration required for the role during the Design and Configure stages. (If no role has an initial average duration estimate of more than four weeks, then processing continues at operation 726 (FIG. 7C), discussed below).

One skilled in the art will recognize that the number four (4) as used in operation 710 reflects only one embodiment and should not be taken to be limiting. Any maximum role duration value may be used without departing from the nature and function of the estimation method described herein.

In operation 712, the resource value for the role is incremented. This means that there are now more personnel allocated to the role, so the work associated with the role can be performed in less time. Accordingly, the duration for the role is recalculated in operation 714, based on the additional resource that was allocated to the role in operation 712.

Because the duration of one of the roles has been reduced in operation 714, the duration of the Design and Configure stage must be re-calculated based on the decreased duration of the role as determined in operation 714. Accordingly, the duration of the Design and Configure stages is recalculated in operation 716. The new numbers, when finally displayed in operation 737, will be reflected in the estimated duration display area 632.

In operation 718, the number of resources assigned to the subject role is compared with a maximum resource value. In at least one embodiment, the maximum resource value is three (3). If the assigned resources exceed the maximum resource value, the operation of the planning operation 22 is aborted in operation 719.

Otherwise, processing continues at operation 720. In operation 720 it is determined again whether the duration for a role exceeds the maximum role duration value. In at least one embodiment, the maximum role duration value is a value of four (4) weeks. If the maximum rule duration value for the role is not exceeded, processing continues at operation 724. If so, it may be necessary to attempt to add more resources in order to reduce the role's contribution to the overall duration of the Design and Configure stages. To determine whether such action is necessary, it is determined in operation 722 whether the total project duration exceeds a maximum desired duration. In at least one embodiment, the maximum desired duration value is 52 weeks, but one skilled in the art will recognize that any reasonable duration may be used as a maximum desired duration value. One skilled in the art will note that the user may select a smaller maximum desired duration value. However, if the user selects a maximum desired duration value that exceeds a Duration Limit, then the maximum desired duration value will be set to the Duration Limit during the initialization operation 700 discussed above.

If it is determined in operation 722 that the total project duration exceeds the maximum desired duration, processing returns to operation 712. If not, then no further resources will be added to the role, regardless of whether the duration for the role exceeds the maximum role duration value (i.e., four (4) weeks in at least one embodiment).

Operation 724 is performed to determine whether additional roles have yet to be processed. Operations 710 through 724 are performed iteratively until no further roles remain to be processed.

If no further roles remain to be processed, then processing continues at operation 726 in FIG. 7C. Operation 726 is performed as a somewhat redundant double-check in the case that operations 712 through 724 have been performed. However, operation 726 provides a useful bounds check feature when it is executed as a result of the evaluation in operation 710 evaluating to "no." In operation 726, it is determined whether the total estimated project duration exceeds the Duration Limit. The Duration Limit reflects the amount of time after which estimation is no longer feasible because it is not likely to yield accurate results. In at least one embodiment, the Duration Limit is 52 weeks.

In operation 730, the duration estimates are no longer "initial" estimates but are finalized estimates, and the stages are accordingly scheduled by allocating the stages across the total project duration, based upon the average of the low and high estimated duration values for each stage. FIG. 6B illustrates a sample display screen area 620 that displays to the user the average duration as calculated in operations 702 and 704, and as modified if operation 716 has been executed. The average duration is displayed graphically, as one or more labeled boxes on a dated week-column display. [Such information is not displayed to the user until operation 737, after other calculations have been performed.] In at least one embodiment, a user-provided project start date is also displayed on the display screen.

Figure 8:
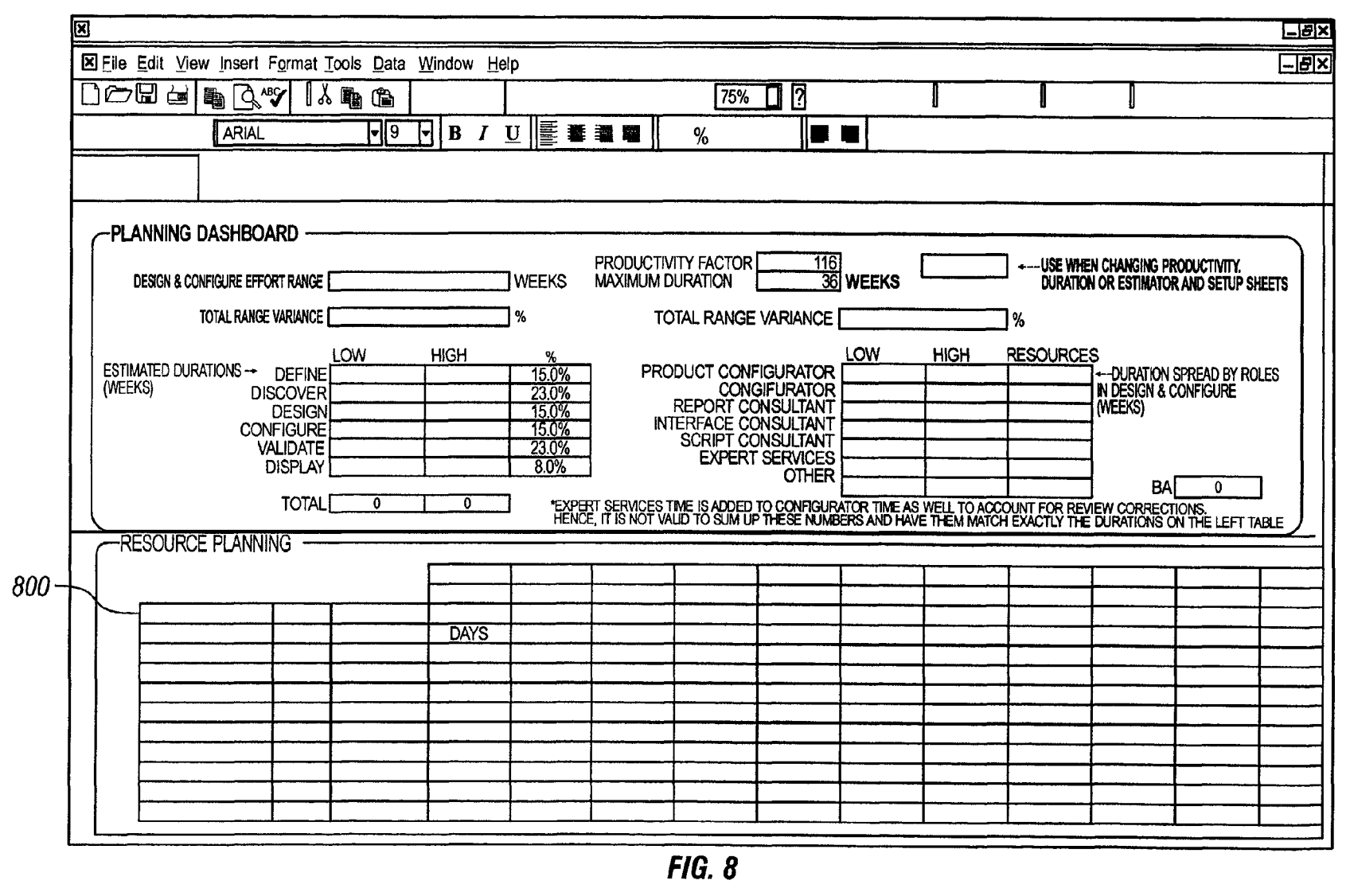

FIGS. 7C and 8 illustrate that, in operation 732, resource planning is performed. During the resource planning operation 732, rules are utilized to determine which resource(s) should be associated with a particular unit of the schedule, such as a week, and a particular billable rate is assigned to each resource. FIG. 8 illustrates, for example that the resources, such as Product Configurator 1 and Product Configurator 2, that have been attributed to a role are displayed on a resource planning display area 800. The duration (in weeks) and the LOE (in hours) associated with each resource is tracked and displayed. Based on resource rules, it is determined when during the implementation project each resource should perform its task. For instance, example resource rules include:

Engagement managers are required five days per week through the end of the Define stage, and one day per week thereafter.

Project managers are required five days per week throughout the project.

Tech lead starts one week after the start of the project and ends one week before the end of the Deploy stage, etc.

One skilled in the art will recognize that the resource rules may be implemented as required for a particular context; the foregoing examples are provided for illustration purposes only.

Figures 1, 9A:
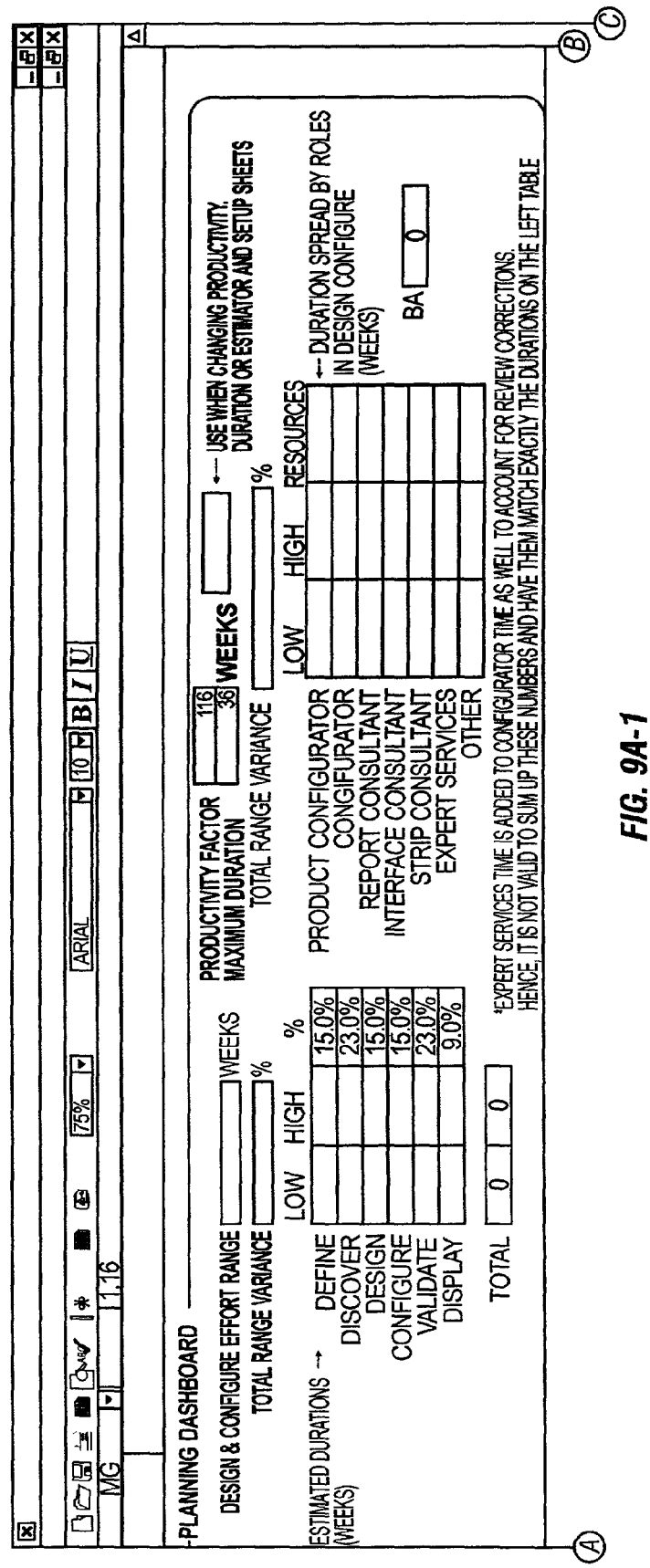
FIGS. 9A and 9B are exemplary screen displays illustrating an interface that provides and receives estimate planning information during a planning operation.
Figures 2, 9A:
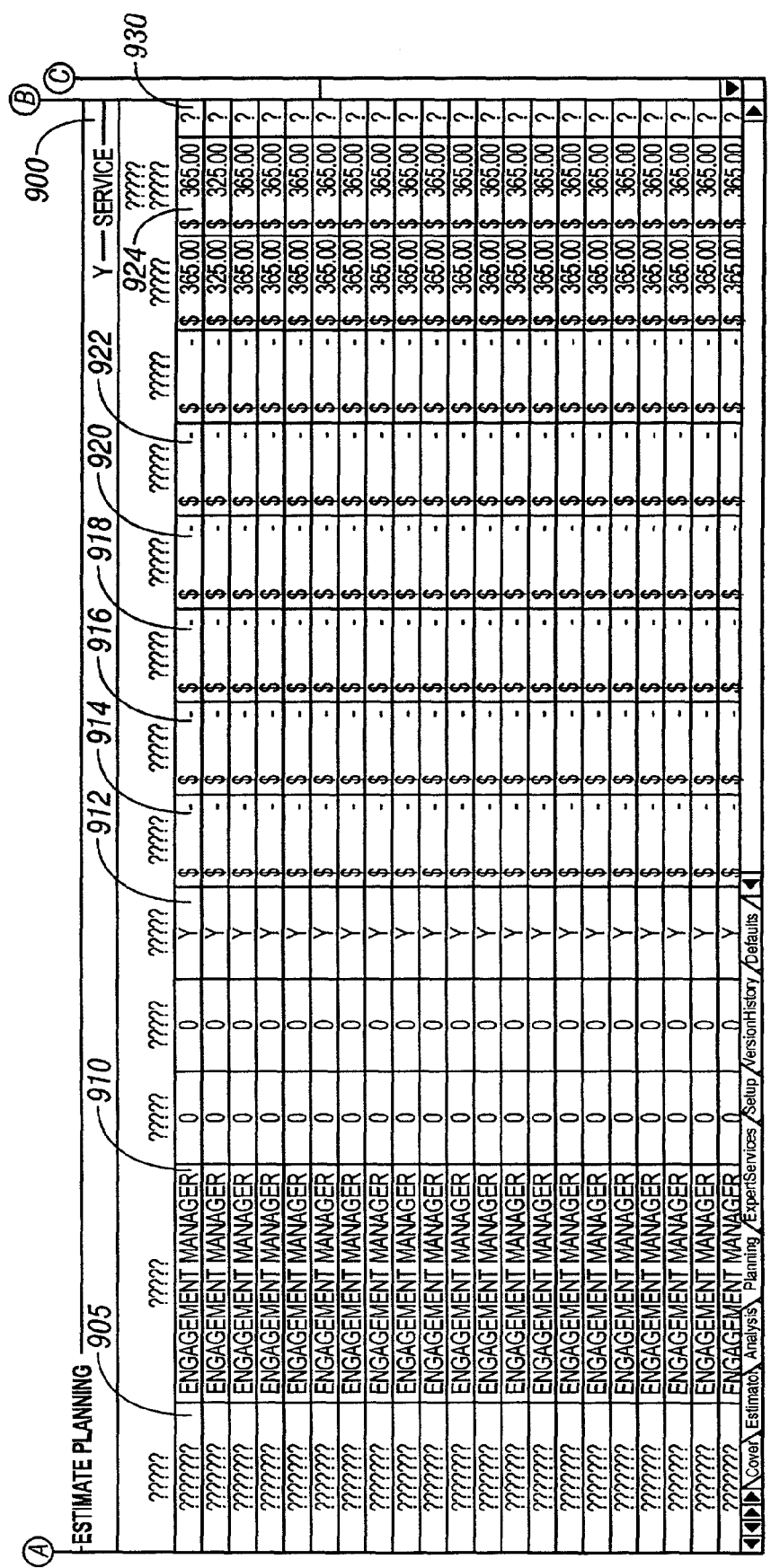
Figures 1, 9B:
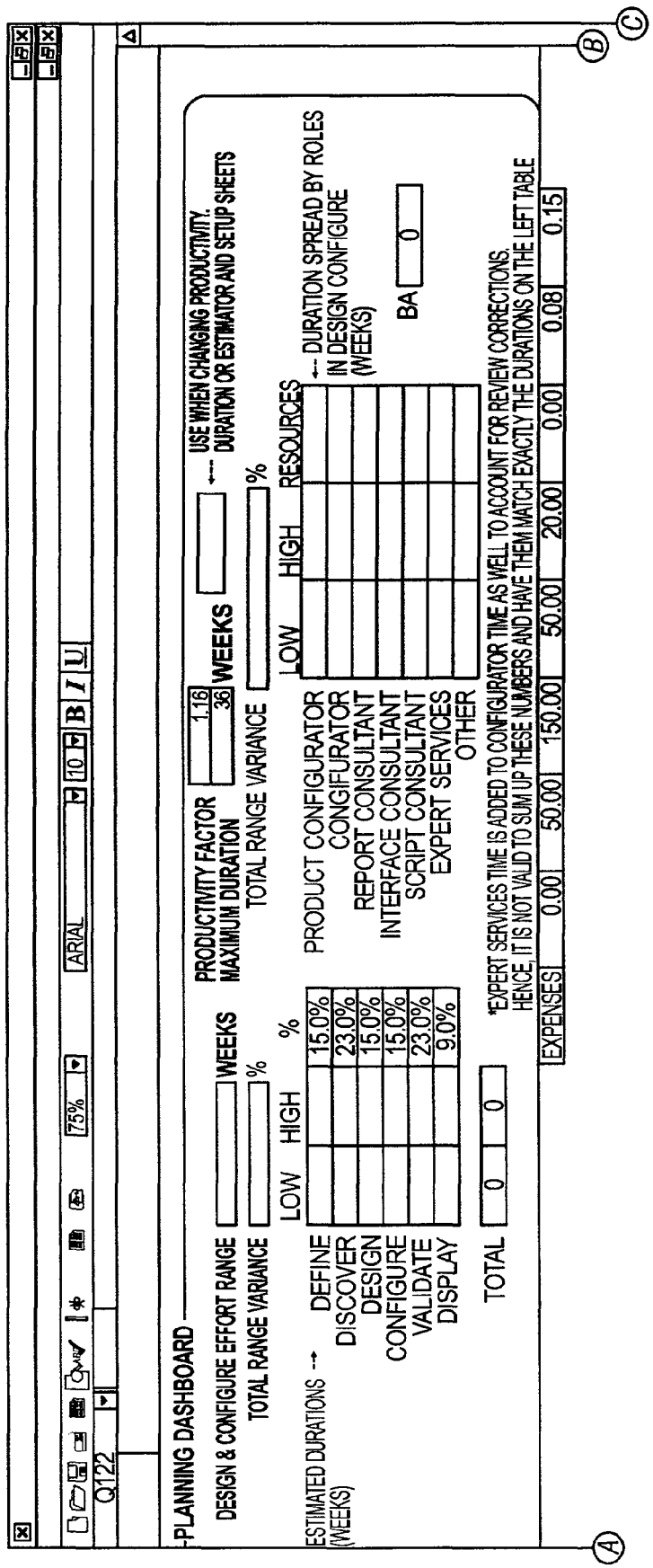

FIGS. 7C, 9A, and 9B illustrate that, in operation 734, billable rates and expenses are determined through user input. The user is requested to provide, via an interface such as that displayed in the screen display 900 illustrated in FIG. 9A, a resource type 910 for each displayed role 905. A default hourly rate is associated with each role 905. However, FIG. 9B illustrates that the default hourly rate may be modified by the user via a resource rate display area 950 on a display screen 945.

FIG. 9A further illustrates that the display screen 900 also provides an area 912 in which to specify whether a resource is local to the implementation site or not. In at least one embodiment, the default setting identifies all resources as local. The display provides an airfare display area 914, a transportation expense display area 916, a lodging expense display area 918, a meals expense display area 920, and a miscellaneous expense display area 922 for each resource. If the user does not modify the default settings for such expenses, then the default settings will apply. In at least one embodiment, the default settings are as follows: Airfare ($0), Transportation ($50), (Lodging $150), Meals ($50), and Miscellaneous ($20.00). The display screen 900 also provides an area 924 that indicates the discounted hourly rate for each resource, in case a discount rate is to be applied to the resource. The display screen 900 provides an interface area (not shown) via which the user can indicate the discount rate to be applied to the project. The display screen 900 also provides an interface area (not shown) on the display screen 900 wherein the user may indicate whether the services associated with the implementation project are taxable and may also indicate, if taxable, the services tax rate. Similarly, the display screen 900 also provides an interface area (not shown) on the display screen 900 wherein the user may indicate whether the expenses associated with the implementation project are taxable. The user may also enter a default contingency rate.

In operation 736, costs (from the customer's point of view) or revenue (from the software provider's point of view) are determined.

In operation 737, calculated values are displayed to the user. FIG. 9A illustrates, for instance that calculated total expenses for each resource may be displayed in a resource total area 930.

Figures 10A, 15:
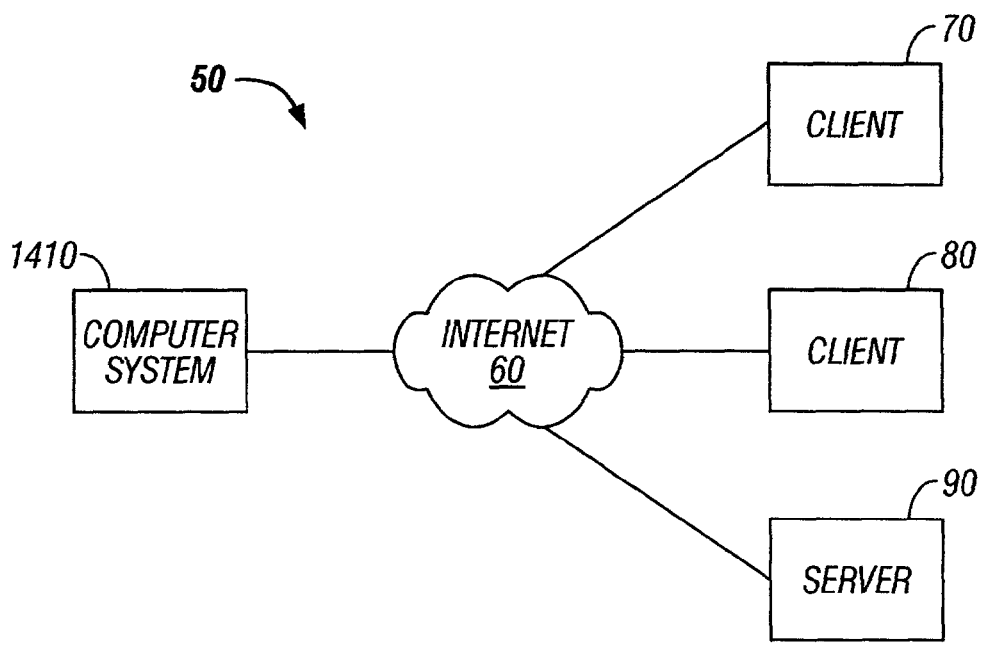
FIG. 10A is an exemplary screen display illustrating an interface that provides for receiving function point information for a bottom-up estimator in accordance with at least one embodiment of the present invention, wherein the function points include expert services reviews and other expert services.
FIG. 15 is a block diagram illustrating the interconnection of the computer system of FIG. 14 to client and host systems.
Figures 1, 10B:
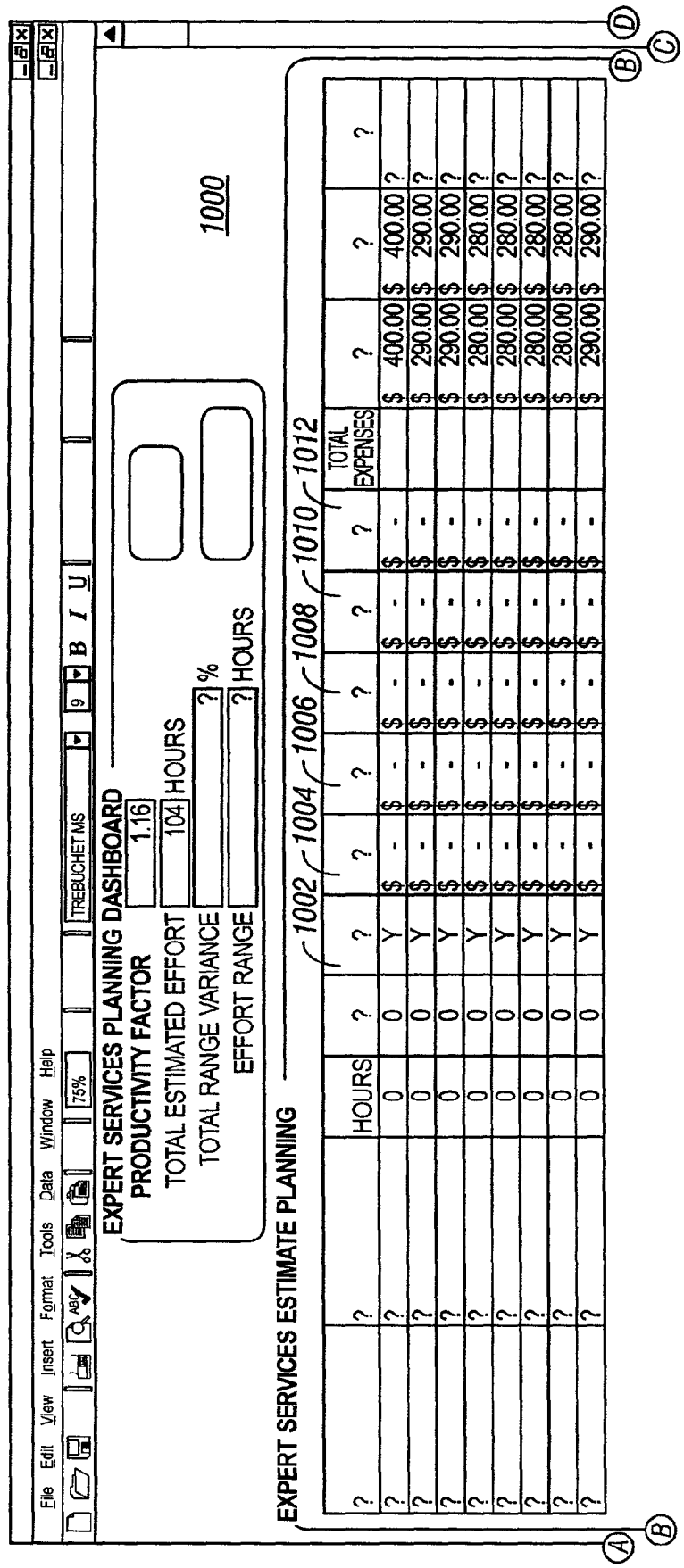
FIG. 10B is an exemplary screen display illustrating an interface that provides and receives estimate planning information during an expert services estimate operation.
Figures 2, 10B:
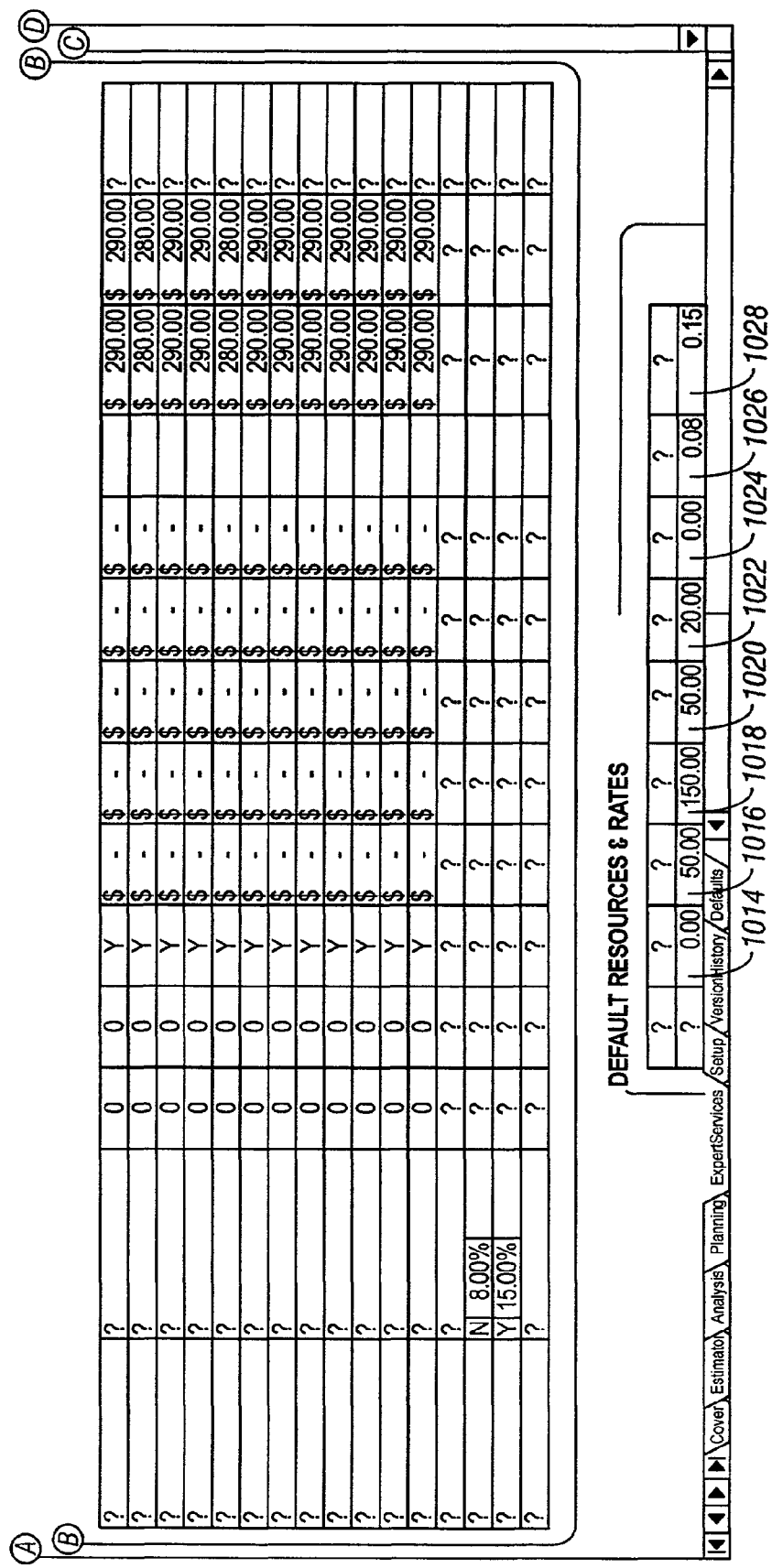

FIGS. 1, 10A, and 10B are relevant to a discussion of an optional expert services estimation process 26. One skilled in the art will recognize that, in at least one alternative embodiment, the expert services estimation process 26 can be implemented as part of the top-down estimation process 22, or not at all. As used herein, the term "expert services" refers to the services of review experts that analyze the effectiveness of a custom software product, and the effectiveness of the customer's utilization of such product, after the product has been implemented.

FIG. 10A is an exemplary partial screen display 300 that provides a module representation 310x for expert services reviews. In at least one embodiment, highlighting and selecting the module representation 310x reveals a drop-down box 340 via which a user can select the desired expert services reviews. FIG. 10A indicates that such expert services reviews include, in at least one embodiment, sizing review, design review, configuration design workshop, configuration review, production readiness review, and the like. The user may select the desired expert services reviews as part of the bottom-up estimation process 16 (FIG. 1) as discussed above in connection with operation 200 (FIG. 2).

FIG. 10B illustrates an exemplary interface screen 1000 that provides for receiving and displaying information to a user during the expert services estimation process 26 (FIG. 1). The estimator tool that implements the expert services estimation process 26 is configured to receive information entered by the user via the interface screen 1000, including the name of the review, resources allocated to perform the review, and the number of hours of effort for each role per review. In at least one embodiment, the user may enter the hours of effort assigned to a review in the drop-down box 340 (FIG. 10A).

In at least one embodiment, information is manually entered by the user via the interface screen 1000, as it is not automatically populated based on the information entered during the bottom-up estimation process 16 (FIG. 1). The processing performed during the expert services estimation process 26 (FIG. 1) does not estimate duration for expert services reviews, since expert services reviews and workshops are relatively discrete events with a set duration period. Accordingly, the expert services estimation process 26 (FIG. 1) calculates cost/revenue based on effort rather than duration.

During the expert services estimation process 26 (FIG. 1), the user may also enter expenses for each resource in the same manner as described above in connection with FIGS. 9A and 9B. For instance, if the user enters a value indicating that the resource is non-local in display area 1002, then the user should then enter an airfare expense value in the airfare display area 1002 and enter expenses values in the expenses display areas 1004, 1006, 1008, 1010, and 1012. If the user does not enter expense values, default values 1014 through 1028 are used in the expert services estimation process 26 (FIG. 1).

In sum, FIG. 1 illustrates an estimation method that includes a bottom-up estimation process 16 and top-down estimation process 22. Each of these estimation processes 16, 22 may be implemented as one or more software modules. In addition, the one or more software modules, or additional modules, may be fashioned to implement the remaining functions described in connection with the estimation method described in FIG. 1, including the setup 13, default reset 14, and expert services 26 functions. A set of one or more software modules that implement the functionality described in connection with FIG. 1 is sometimes referred to herein as a software estimator tool. One skilled in the art will recognize that a function described herein may be implemented within a single software module, or as a set of related modules. One skilled in the art will also recognize that modules implementing the features discussed herein may comprise software modules, hardware modules, firmware modules, or a combination thereof.

In at least one embodiment of a software estimator tool as described herein, an interface is provided. The interface provides for generation, management, and display of various display screens such as those illustrated in FIGS. 3A, 3B, 3C, 3D, 4, 5, 6A, 6B, and 8 through 12. In a preferred embodiment, such display screens are generated, managed, and displayed as a result of the execution of software modules written in Visual Basic™. One skilled in the art will recognize that any appropriate programming language, including script language, may be used to generate the necessary interface screens. In an alternative embodiment, for instance, the software estimator tool, including the interface, is implemented in Visual C or Visual C++ programming language.

FIG. 3C illustrates that, in a least one embodiment, the interface includes a display screen 300 having one or more information display areas 380a through 380n. Additional information regarding the functionality of the estimator tool and its interface is displayed in the information display areas 380a-380n. In at least one embodiment, one or more of the information display areas 380a-380n is displayed on the display screen 300 in reaction to the user's activation of a "Getting Started" object 382.

FIG. 3D, in connection with FIG. 1, illustrates another feature of at least one embodiment of the interface. A setup page 350 provides an interface for receiving user-provided default settings. Using the guidance provided by the setup screen 350 (as discussed above in connection with the description of complexity levels for configuration enhancements), a user may modify the effort estimates 372a, 372b, 372c based the user's own empirical data. Such revision of the default values occurs during a setup operation 13 (FIG. 1). Other default values displayed on the setup display screen 350 may also be modified by the user during the setup operation 13 (FIG. 1), including estimated project stage percentages 374, number of work hours per day, week, and month 376, and the like.

Figure 12:
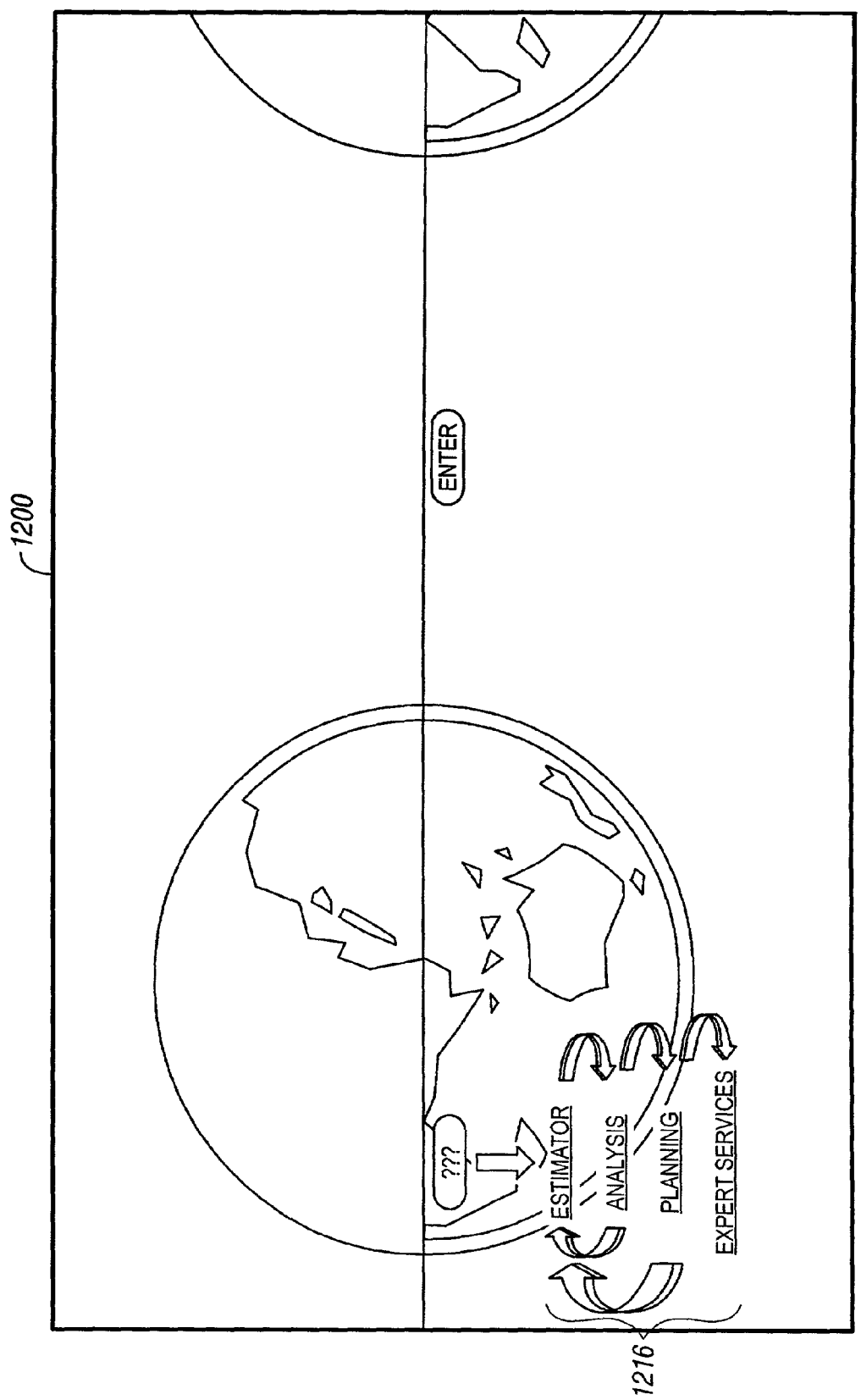
FIG. 12 is an exemplary initial screen display illustrating an interface that provides for invocation of an estimator tool.

FIG. 12 illustrates an exemplary initial display screen 1200 that may optionally be included in at least one embodiment of the interface. The initial display screen 1200 includes a reset object 1202 that, when activated by the user, initiates the reset defaults operation 14 illustrated in FIG. 1. The initial display screen 1200 further includes, in at least one embodiment, an "enter object" 1204 that, when activated, initiates operation of the estimator tool at the start operation 12 (FIG. 1). The initial display screen 1200 further includes, in at least one embodiment, a visual graphic 1216 indicating the optionally iterative nature of the estimator tool. The visual graphic 1216 further includes, in at least one embodiment, hyperlinks 1206, 1208, 1210, and 1214 that enable the user to proceed directly to the bottom-up estimation process 16, the analysis process 18, the planning process 22, or the expert services estimation process 26, (FIG. 1) respectively.

In addition to the interface discussed immediately above, the method described herein includes manipulation and processing of various data, including LOE, duration, resources, role types, tax rates, expense values, and the like. In a preferred embodiment, manipulation and processing of such data is accomplished through a spreadsheet processing software application, such as Microsoft Excel™. In a preferred embodiment, the mechanism through which such data is processed is hidden from the user, the interface described above being independent of the underlying data processing mechanism. In at least one alternative embodiment, a database processing application is utilized in the processing of such data, such as an application based on the Microsoft Access™ database product.

Figure 13:
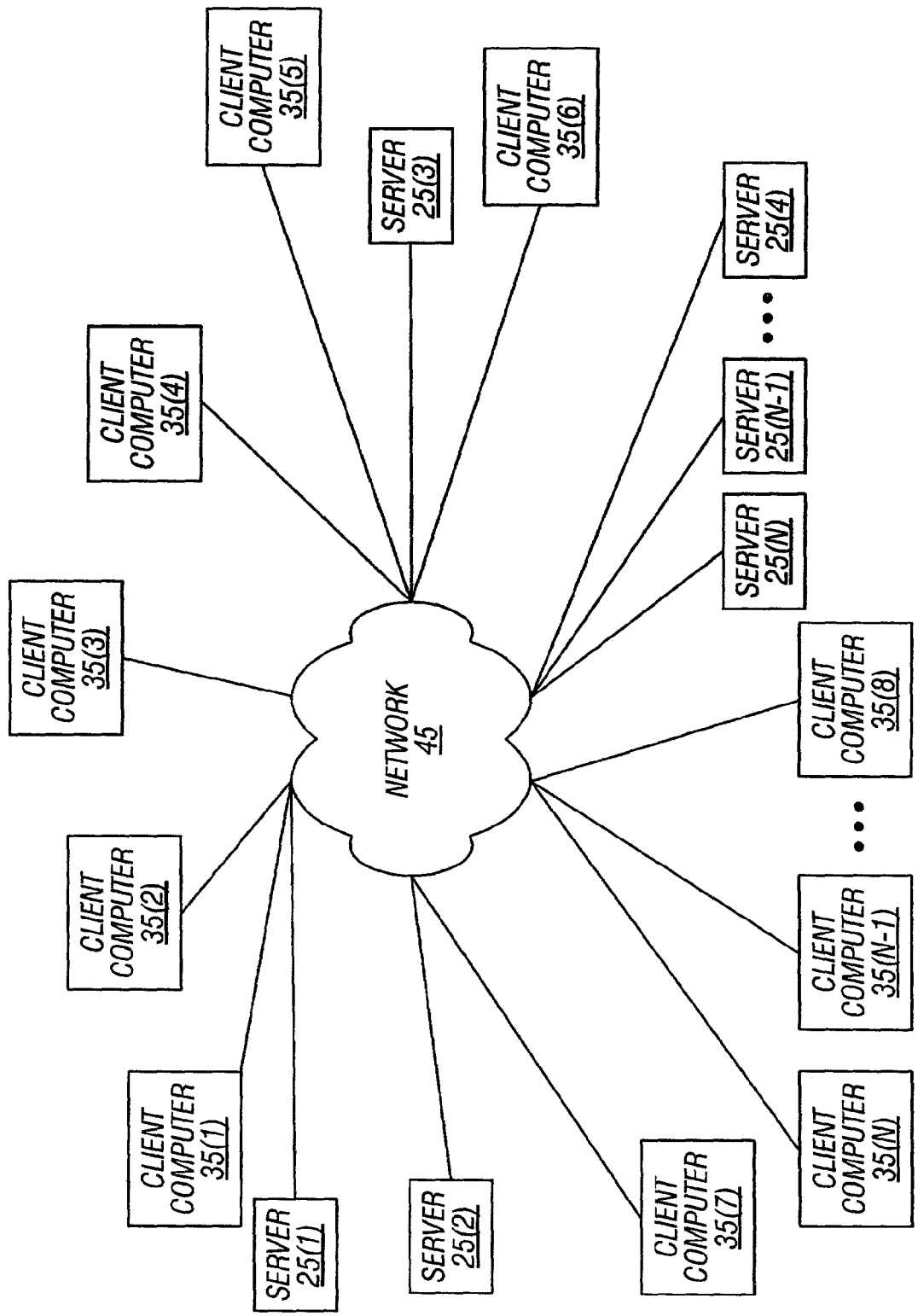
FIG. 13 is a block diagram illustrating a network environment in which an estimator tool according to at least one embodiment of the present invention may be practiced.

FIG. 13 is a block diagram illustrating a network environment in which a system according to the present invention may be practiced. As is illustrated in FIG. 13, network 45, such as a private wide area network (WAN) or the Internet, includes a number of networked servers 25(1)-(N) that are accessible by client computers 35(1)-(N). Communication between client computers 35(1)-(N) and servers 25(1)-(N) typically occurs over a publicly accessible network, such as a public switched telephone network (PSTN), a DSL connection, a cable modem connection, or large bandwidth trunks (e.g., communications channels providing T1 or OC3 service). Client computers 35(1)-(N) access servers 25(1)-(N) through, for example, a service provider. This might be, for example, an Internet Service Provider (ISP) such as America On-Line™, Prodigy™, CompuServe™, or the like. Access is typically had by executing application specific software (e.g., network connection software and a browser) on any given one of client computers 35(1)-(N).

It will be noted that the variable identifier "N" is used in several instances in FIG. 13 to more simply designate the final element (e.g., servers 25(1)-(N) and client computers 35(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

One or more of client computers 35(1)-(N) and/or one or more of servers 25(1)-(N) may be, for example, a computer system of any appropriate design, in general, including a mainframe, a mini-computer, or a personal computer system. Such a computer system typically includes a system unit having a system processor and associated volatile and non-volatile memory, one or more display monitors and keyboards, one or more diskette drives, one or more fixed disk storage devices, and one or more printers. These computer systems are typically information handling systems that are designed to provide computing power to one or more users, either locally or remotely. Such a computer system may also include one or a plurality of I/O devices (i.e., peripheral devices) which are coupled to the system processor and which perform specialized functions, such as those of the software estimator tool and interface described herein. Examples of I/O devices include modems, sound and video devices, and specialized communication devices. Mass storage devices such as hard disks, CD-ROM drives, and magneto-optical drives may also be provided, either as an integrated or peripheral device. One such example computer system, discussed in terms of client computers 35(1)-(N), is shown in detail in FIG. 14.

Figure 14:
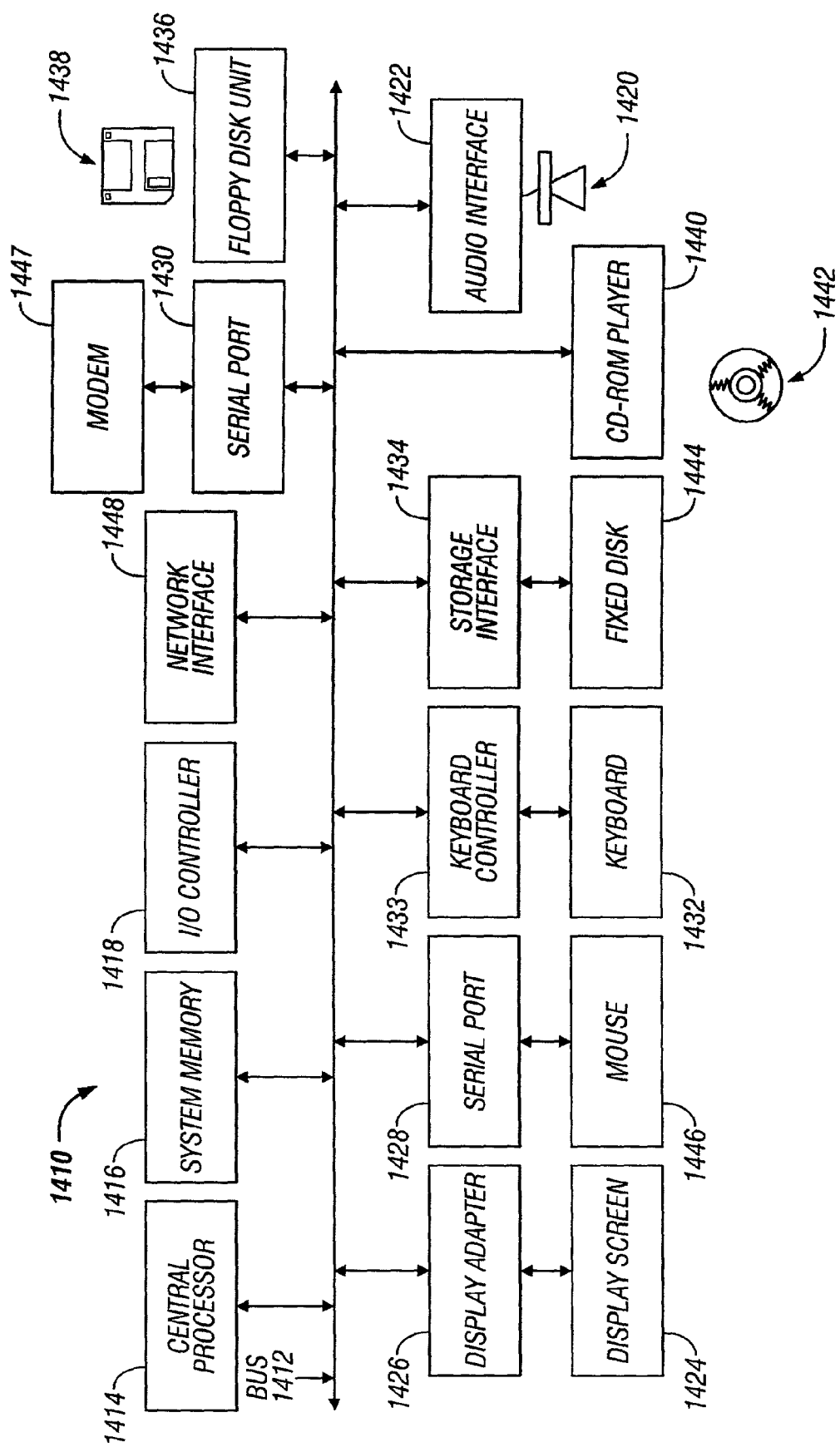
FIG. 14 is a block diagram illustrating a computer system suitable for implementing embodiments of the present invention.

FIG. 14 depicts a block diagram of a computer system 1410 suitable for implementing the present invention, and an example of one or more of client computers 35(1)-(N). Computer system 1410 includes a bus 1412, which interconnects major subsystems of computer system 1410 such as a central processor 1414, a system memory 1416 (typically RAM, but which may also include ROM, flash RAM, or the like), an input/output controller 1418, an external audio device such as a speaker system 1420 via an audio output interface 1422, an external device such as a display screen 1424 via display adapter 1426, serial ports 1428 and 1430, a keyboard 1432 (interfaced with a keyboard controller 1433), a storage interface 1434, a floppy disk drive 1436 operative to receive a floppy disk 1438, and a CD-ROM drive 1440 operative to receive a CD-ROM 1442. Also included are a mouse 1446 (or other point-and-click device, coupled to bus 1412 via serial port 1428), a modem 1447 (coupled to bus 1412 via serial port 1430), and a network interface 1448 (coupled directly to bus 1412).

Bus 1412 allows data communication between central processor 1414 and system memory 1416, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 1410 are generally stored on and accessed via a computer readable medium, such as a hard disk drive (e.g., fixed disk 1444), an optical drive (e.g., CD-ROM drive 1440), floppy disk unit 1436, or other storage medium. Additionally, applications may be in the form of electronic signals modulated in accordance with the application and data communication technology when accessed via network modem 1447 or interface 1448.

Storage interface 1434, as with the other storage interfaces of computer system 1410, may connect to a standard computer readable medium for storage and/or retrieval of information, such as a fixed disk drive 1444. Fixed disk drive 1444 may be a part of computer system 1410 or may be separate and accessed through other interface systems. Many other devices can be connected such as a mouse 1446 connected to bus 1412 via serial port 1428, a modem 1447 connected to bus 1412 via serial port 1430, and a network interface 1448 connected directly to bus 1412. Modem 1447 may provide a direct connection to a remote server via a telephone link or to the Internet via an internet service provider (ISP). Network interface 1448 may provide a direct connection to a remote server via a direct network link to the Internet via a POP (point of presence). Network interface 1448 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., bar code readers, document scanners, digital cameras, and so on). Conversely, it is not necessary for all of the devices shown in FIG. 14 to be present to practice the present invention. The devices and subsystems may be interconnected in different ways from that shown in FIG. 14. The operation of a computer system such as that shown in FIG. 14 is readily known in the art and is not discussed in detail in this application. Code to implement the present invention may be stored in computer-readable storage media such as one or more of system memory 1416, fixed disk 1444, CD-ROM 1442, or floppy disk 1438. Additionally, computer system 1410 may be any kind of computing device, and so includes personal data assistants (PDAs), network appliance, X-window terminal, or other such computing device. The operating system provided on computer system 1410 may be MS-DOS®, MS-WINDOWS®, OS/2®, UNIX®, Linux®, or other known operating system. Computer system 1410 also supports a number of Internet access tools, including, for example, an HTTP-compliant web browser having a JavaScript interpreter, such as Netscape Navigator® 3.0, Microsoft Explorer® 3.0, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment discloses components that are contained within different other components (e.g., the various elements shown as components of computer system 1410). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

FIG. 15 is a block diagram depicting a network 50 in which computer system 1410 is coupled to an internet 60, which is coupled, in turn, to client systems 70 and 80, as well as a server 90. Internet 60 (e.g., the Internet) is also capable of coupling client systems 70 and 80 and server 90 to one another. With reference to computer system 1410, modem 1447, network interface 1448 or some other method can be used to provide connectivity from computer system 1410 to internet 60. Computer system 1410, client system 70 and client system 80 are able to access information on server 90 using, for example, a web browser (not shown). Such a web browser allows computer system 1410, as well as client systems 70 and 80, to access data on server 90 representing the pages of a website hosted on server 90. Protocols for exchanging data via the Internet are well known to those skilled in the art. Although FIG. 15 depicts the use of the Internet for exchanging data, the present invention is not limited to the Internet or any particular network-based environment.

Referring to FIGS. 13, 14, and 15, a browser running on computer system 1410 employs a TCP/IP connection to pass a request to server 90, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the HTML file using local resources (e.g., fonts and colors).

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of a fully functional computer system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM drives, transmission type media such as digital and analog communications links, as well as media storage and distribution systems developed in the future.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention.

Consequently, the invention is intended to be limited only by the spirit and scope appended claims, giving full cognizance to equivalents in all respects.

What is claimed is:

1. A computer-implemented method, comprising:
    determining a plurality of stages required to implement a custom software product, wherein
        the custom software product is comprised of a plurality of pre-written generic software modules;
    calculating, using a processor, a duration value for each of the plurality of stages, wherein
        a duration value for at least one of the plurality of stages is calculated based upon a cumulative estimated level of effort for at least one other of the plurality of stages,
        the cumulative estimated level of effort is determined using a plurality of function points, and each of the plurality of function points represent work to be performed to implement the custom software product;
determining a duration values for each of a plurality of personnel types required to implement the custom software product, wherein
each of the duration values are determined based upon a respective estimated level of effort of a plurality of levels of effort, and
the plurality of levels of effort are used to calculate the cumulative estimated level of effort;
attributing one or more resources for each personnel type having a duration value that is non-zero;
scheduling the plurality of stages;
attributing a billable rate to each resource;
calculating a billable revenue value for implementation of the custom software product; and
displaying the billable revenue value on a display.

2. The computer-implemented method recited in claim 1, further comprising:
determining a level of effort for each resource;
determining a duration for each resource; and
scheduling each resource.

3. The computer-implemented method recited in claim 1, wherein
calculating a billable revenue further comprises calculating expenses.

4. The computer-implemented method recited in claim 3, wherein
calculating expenses further comprises determining expenses associated with each resource.

5. The computer-implemented method recited in claim 1, wherein
calculating a billable revenue further comprises calculating taxes.

6. The computer-implemented method recited in claim 1, further comprising:
calculating billable revenue for one or more expert services reviews.

7. The computer-implemented method recited in claim 1, wherein
the cumulative estimated level of effort is based on a level of effort associated with each of one or more of the pre-written generic software modules.

8. The computer-implemented method recited in claim 1, wherein
the cumulative estimated level of effort is based on a level of effort associated with each of one or more configuration changes to one of the pre-written generic software modules.

9. The computer-implemented method recited in claim 8, wherein
each of the one or more configuration changes is associated with one of a plurality of complexity levels, the plurality of complexity levels further including a low level and a high level.

10. The computer-implemented method recited in claim 8, wherein
the plurality of complexity levels further includes a medium level.

11. The computer-implemented method recited in claim 1, wherein
the estimated level of effort reflects a range having a lower end value and a higher end value.

12. The computer-implement method of claim 1, further comprising:
determining the plurality of function points for inclusion in the cumulative estimated level of effort;
determining estimated levels of effort for each function point of the plurality of function points; and
determining, based upon said estimated levels of effort, said cumulative estimated level of effort, wherein
the at least one other of the plurality of stages does not include the at least one of the plurality of stages.

13. A computer system, comprising:
a processor;
means for determining a plurality of function points, wherein
each of the function points represent work to be performed to implement a custom software product, and
the custom software product is comprised of a plurality of pre-written generic software modules;
means for determining an estimated value for each of the function points, wherein
each estimated value is generated by applying objective metric data to one of said function points;
means for determining a plurality of stages required to implement the custom software product;
means for determining a duration value for at least one of the plurality of stages by performing a function point analysis to determine a cumulative estimated level of effort for the plurality of function points;
means for calculating a duration value for each of the plurality of stages, wherein
a duration value for at least one other of the plurality of stages is calculated based upon the duration value for the at least one of the plurality of stages; and
means for determining a plurality of duration values for each of a plurality of personnel types required to implement the custom software product.

14. The computer system recited in claim 13, further comprising:
means for causing said processor to calculate a billable revenue value for implementation of the custom software product, based on the cumulative level of effort.

15. The computer system recited in claim 13, further comprising:
means for attributing one or more resources for each personnel type having a non-zero duration value;
means for scheduling the stages; and
means for attributing a billable rate to each resource.

16. The computer system recited in claim 13, wherein
the means for determining a plurality of function points further comprise means for identifying a desired configuration change to one of the plurality of pre-written generic software modules.

17. A computer program product comprising:
computer instructions comprising:
instructions to determine a plurality of function points, wherein
each of the function points represent work to be performed to implement a custom software product, and
the custom software product is comprised of a plurality of pre-written generic software modules;
instructions to determine an estimated value for each of the function points, wherein
each estimated value is generated by applying objective metric data to one of said function points;
instructions to determine a plurality of stages required to implement the custom software product;
instructions to determine a duration value for at least one of the plurality of stages by performing a function point analysis to determine a cumulative estimated level of effort for the plurality of function points;

instructions to calculate a duration value for each of the plurality of stages, wherein
a duration value for at least one other of the plurality of stages is calculated based upon the duration value for the at least one of the plurality of stages;

instructions to determine a plurality of duration values for each of a plurality of personnel types required to implement the custom software product, a personnel type of the plurality of personnel types; and a non-transitory computer-readable storage medium on which the computer instructions are stored.

18. The computer program product recited in claim 17, wherein the computer instructions further comprise:
instructions to calculate a billable revenue value for implementation of the custom software product, based on the cumulative level of effort.

19. The computer program product recited in claim 17, wherein the computer instructions further comprise:
instructions to attribute one or more resources for each personnel type having a non-zero duration value;
instructions to schedule the stages; and
instructions to attribute a billable rate to each resource.

20. The computer program product recited in claim 17, wherein
instructions to determine a plurality of function points further comprise instructions to identify a desired configuration change to one of the plurality of pre-written generic software modules.

21. A system comprising:
at least one processor;
means for determining a plurality of stages required to implement a custom software product, wherein
the custom software product is comprised of a plurality of pre-written generic software modules, and
the means for determining said plurality of said stages is coupled to the at least one processor;
means for calculating, a duration value for each of the plurality of stages, wherein
a duration value for at least one of the plurality of stages is calculated based upon a cumulative estimated level of effort for at least one other of the plurality of stages,
the cumulative estimated level of effort is determined using a plurality of function points,
each of the plurality of function points represent work to be performed to implement the custom software product, and
the means for calculating the duration value for each of the plurality of stages is coupled to the means for determining the plurality of stages;
means for determining a duration values for each of a plurality of personnel types relevant to implementing the custom software product, wherein
each of the duration values are determined based upon a respective estimated level of effort of a plurality of levels of effort,
the plurality of levels of effort are used to calculate the cumulative estimated level of effort, and
the means for determining said duration value for each of said plurality of said personnel types is coupled to the at least one processor;
means for attributing one or more resources for each personnel type having a duration value that is non-zero, wherein
said the means for attributing the one or more resources is coupled to the at least one processor;
means for scheduling the plurality of stages, wherein
the means for scheduling is coupled to the at least one processor;
means for attributing a billable rate to each resource, wherein
the means for attributing said billable rate is coupled to the at least one processor;
means for calculating a billable revenue value for implementation of the custom software product, wherein
the means for calculating said the billable revenue value is coupled to the processor; and
means for presenting the billable revenue value, wherein
the means for presenting said the billable revenue value is coupled to the means for calculating said the billable revenue value.

22. The system recited in claim 21, further comprising:
means for determining a level of effort for each resource;
means for determining a duration for each resource; and
means for scheduling each resource.

23. The system recited in claim 21, wherein
the means for calculating a billable revenue comprises means for calculating expenses.

24. The system recited in claim 23, wherein
the means for calculating expenses comprises means for determining expenses associated with each resource.

25. The system recited in claim 21, wherein
the means for calculating a billable revenue comprises means for calculating taxes.

26. The system recited in claim 21, further comprising:
means for calculating billable revenue for one or more expert services reviews.

27. The system recited in claim 21, wherein
the cumulative estimated level of effort is based on a level of effort associated with each of one or more of the pre-written generic software modules.

28. The system recited in claim 21, wherein
the cumulative estimated level of effort is based on a level of effort associated with each of one or more configuration changes to one of the pre-written generic software modules.

29. The system recited in claim 28, wherein
each of the one or more configuration changes is associated with one of a plurality of complexity levels, the plurality of complexity levels further including a low level and a high level.

30. The system recited in claim 28, wherein
the plurality of complexity levels further includes a medium level.

31. The system recited in claim 21, wherein
the estimated level of effort reflects a range having a lower end value and a higher end value.

32. A non-transitory computer readable storage medium comprising program instructions executable on a processor to perform acts comprising:
determining a plurality of stages required to implement a custom software product, wherein
the custom software product is comprised of a plurality of pre-written generic software modules;
calculating a duration value for each of the plurality of stages, wherein
a duration value for at least one of the plurality of stages is calculated based upon a cumulative estimated level of effort for at least one other of the plurality of stages,
the cumulative estimated level of effort is determined using a plurality of function points, and each of the plurality of function points represent work to be performed to implement the custom software product;

determining a duration value for each of a plurality of personnel types relevant to implementing the custom software product, wherein each of the duration values are determined based upon a respective estimated level of effort of a plurality of levels of effort, and the plurality of levels of effort are used to calculate the cumulative estimated level of effort;

attributing one or more resources for each personnel type having a duration value that is non-zero;

scheduling the plurality of stages;

attributing a billable rate to each resource;

calculating a billable revenue value for implementation of the custom software product; and providing for display of the billable revenue value.

33. The computer readable storage medium recited in claim 32, wherein the program instructions are further executable on a processor to perform acts comprising:

determining a level of effort for each resource;

determining a duration for each resource; and scheduling each resource.

34. The computer readable storage medium recited in claim 32, wherein the cumulative estimated level of effort is based on a level of effort associated with each of one or more configuration changes to one of the pre-written generic software modules.

35. The computer readable storage medium recited in claim 34, wherein each of the one or more configuration changes is associated with one of a plurality of complexity levels, the plurality of complexity levels further including a low level and a high level.

* * * * *

UNITED STATES PATENT AND TRADEMARK OFFICE
CERTIFICATE OF CORRECTION

| | | |
|---|---|---|
| PATENT NO. | : 7,801,834 B2 | Page 1 of 1 |
| APPLICATION NO. | : 10/109262 | |
| DATED | : September 21, 2010 | |
| INVENTOR(S) | : Raymond William Frohnhoefer et al. | |

It is certified that error appears in the above-identified patent and that said Letters Patent is hereby corrected as shown below:

In column 7, line 33, delete "LOB" and insert -- LOE --, therefor.

In column 18, line 51, after "scope" insert -- of the --.

In column 19, line 4, in claim 1, delete "values" and insert -- value --, therefor.

In column 21, line 39, in claim 21, after "calculating" delete ",".

In column 21, line 52, in claim 21, delete "values" and insert -- value --, therefor.

In column 21, line 66, in claim 21, below "wherein" delete "said".

In column 22, line 10, in claim 21, after "calculating" delete "said".

In column 22, line 13, in claim 21, after "presenting" delete "said".

In column 22, line 14, in claim 21, after "calculating" delete "said".

Signed and Sealed this
Sixteenth Day of August, 2011

David J. Kappos
*Director of the United States Patent and Trademark Office*